United States Patent
Drumm

(10) Patent No.: US 11,054,935 B2
(45) Date of Patent: Jul. 6, 2021

(54) STYLUS WITH CONTACT SENSOR

(71) Applicant: Beechrock Limited, Castletown (IM)

(72) Inventor: Owen Drumm, Dublin (IE)

(73) Assignee: Beechrock Limited, Castletown (IM)

( * ) Notice: Subject to any disclaimer, the term of this patent is extended or adjusted under 35 U.S.C. 154(b) by 0 days.

(21) Appl. No.: 16/687,639

(22) Filed: Nov. 18, 2019

(65) Prior Publication Data

US 2020/0159382 A1     May 21, 2020

Related U.S. Application Data

(60) Provisional application No. 62/769,494, filed on Nov. 19, 2018.

(51) Int. Cl.
| | |
|---|---|
| *G09G 5/00* | (2006.01) |
| *G06F 3/041* | (2006.01) |
| *G06F 3/042* | (2006.01) |
| *G06F 3/038* | (2013.01) |
| *G06F 3/0354* | (2013.01) |

(52) U.S. Cl.
CPC .......... *G06F 3/04162* (2019.05); *G06F 3/038* (2013.01); *G06F 3/03542* (2013.01); *G06F 3/03545* (2013.01); *G06F 3/0421* (2013.01); *G06F 3/04186* (2019.05)

(58) Field of Classification Search
CPC .. G06F 3/04162; G06F 3/0418; G06F 3/0421; G06F 3/0423; G06F 3/0383; G06F 3/04186; G06F 3/03545; G06F 1/26; G06F 2203/04106
USPC ....................................................... 345/179
See application file for complete search history.

(56) References Cited

U.S. PATENT DOCUMENTS

| | | | |
|---|---|---|---|
| 6,422,776 B1* | 7/2002 | Nakatani ................ | B43K 1/084 401/209 |
| 2010/0051356 A1 | 3/2010 | Stern et al. | |
| 2011/0169775 A1* | 7/2011 | Liaw ....................... | G06F 3/041 345/175 |
| 2011/0304577 A1 | 12/2011 | Brown et al. | |
| 2013/0257812 A1 | 10/2013 | Wang et al. | |
| 2014/0168142 A1 | 6/2014 | Sasselli et al. | |
| 2014/0267191 A1 | 9/2014 | Takahara | |
| 2014/0268161 A1* | 9/2014 | Arends .................. | G06F 3/0386 356/446 |
| 2015/0029161 A1 | 1/2015 | Koo et al. | |
| 2015/0070330 A1 | 3/2015 | Stern | |
| 2015/0153845 A1* | 6/2015 | Chang ................... | G06F 3/0416 345/179 |

(Continued)

OTHER PUBLICATIONS

PCT International Search Report and Written Opinion, PCT Application No. PCT/IB2019/001243, dated Mar. 17, 2020, 14 pages.

*Primary Examiner* — Jennifer T Nguyen
(74) *Attorney, Agent, or Firm* — Fenwick & West LLP

(57) ABSTRACT

A stylus is communicatively coupled to a touch-sensitive device. The stylus includes a contact sensor and a reporting unit. The stylus or touch-sensitive device includes a contact detection controller. The contact sensor measures one or more properties. The contact detection controller determines, based on measurements of the one or more properties from the contact sensor, whether the stylus is in contact with a surface. The reporting unit transmits an indication of whether the stylus is in contact with the surface to the touch-sensitive device.

16 Claims, 23 Drawing Sheets

(56) References Cited

U.S. PATENT DOCUMENTS

2015/0160744 A1* 6/2015 Mohindra ........... G06F 3/03545
345/179
2015/0293612 A1* 10/2015 Chang .................... G06F 1/263
345/158

* cited by examiner

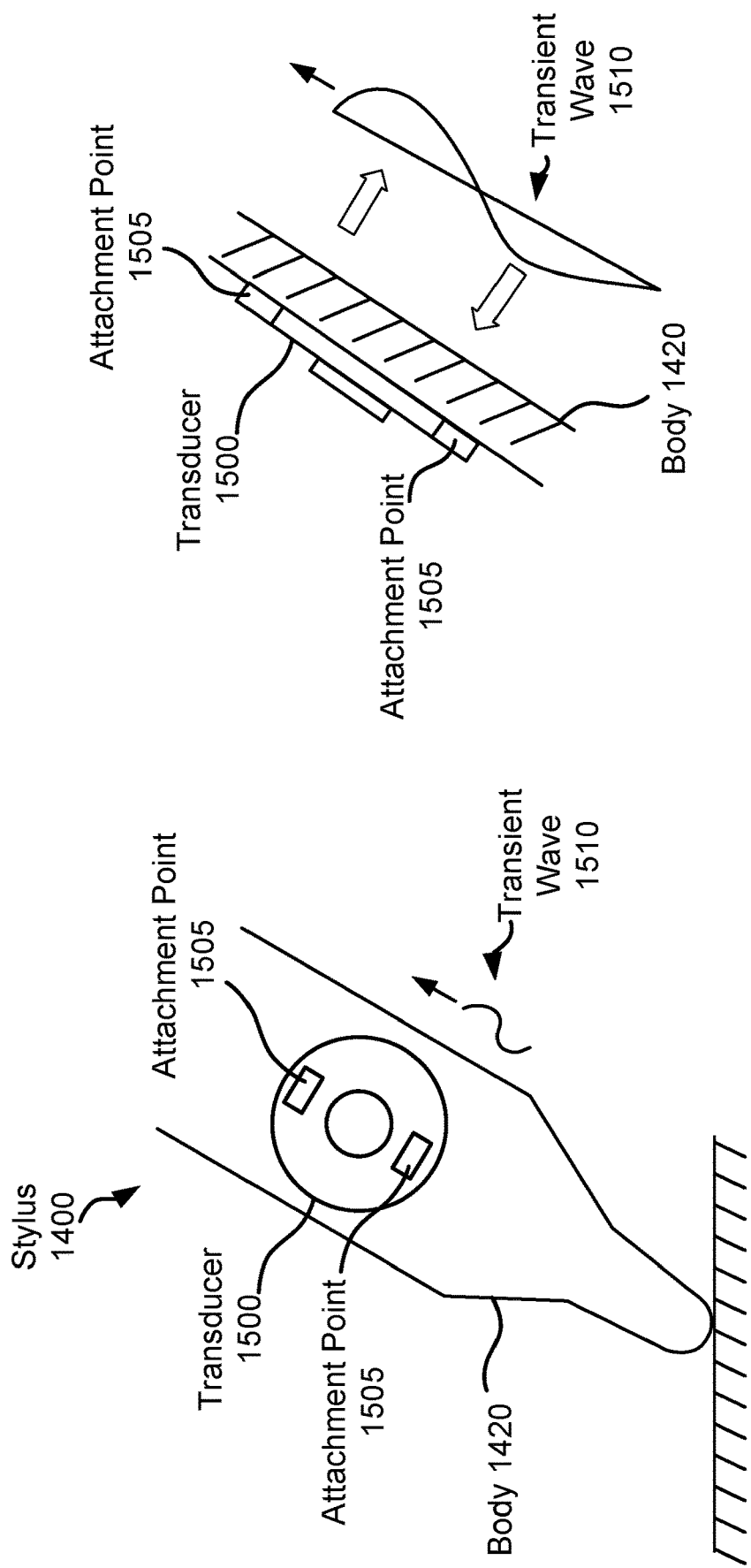

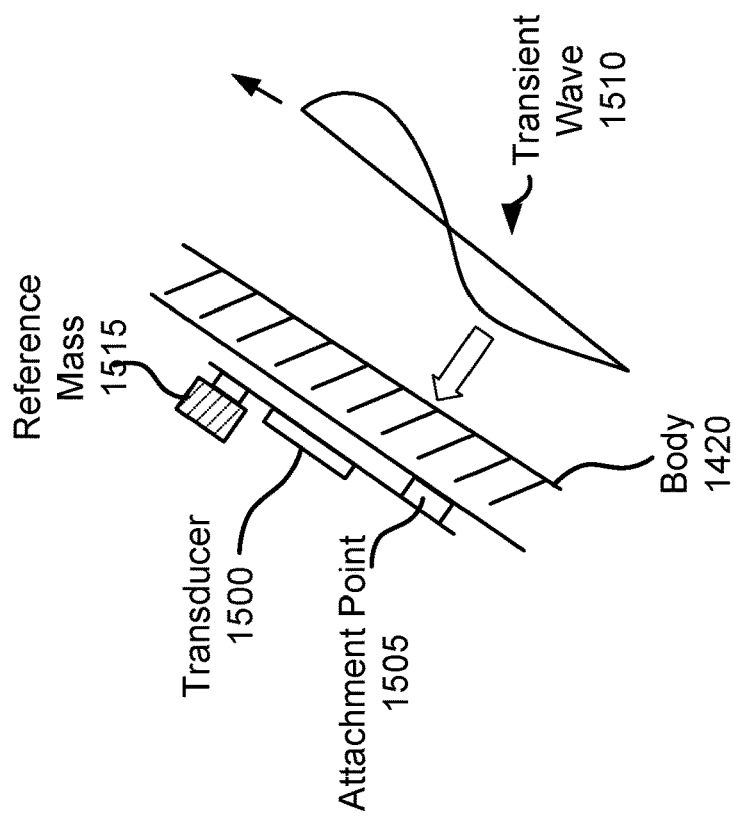
FIG. 15D (Side View)
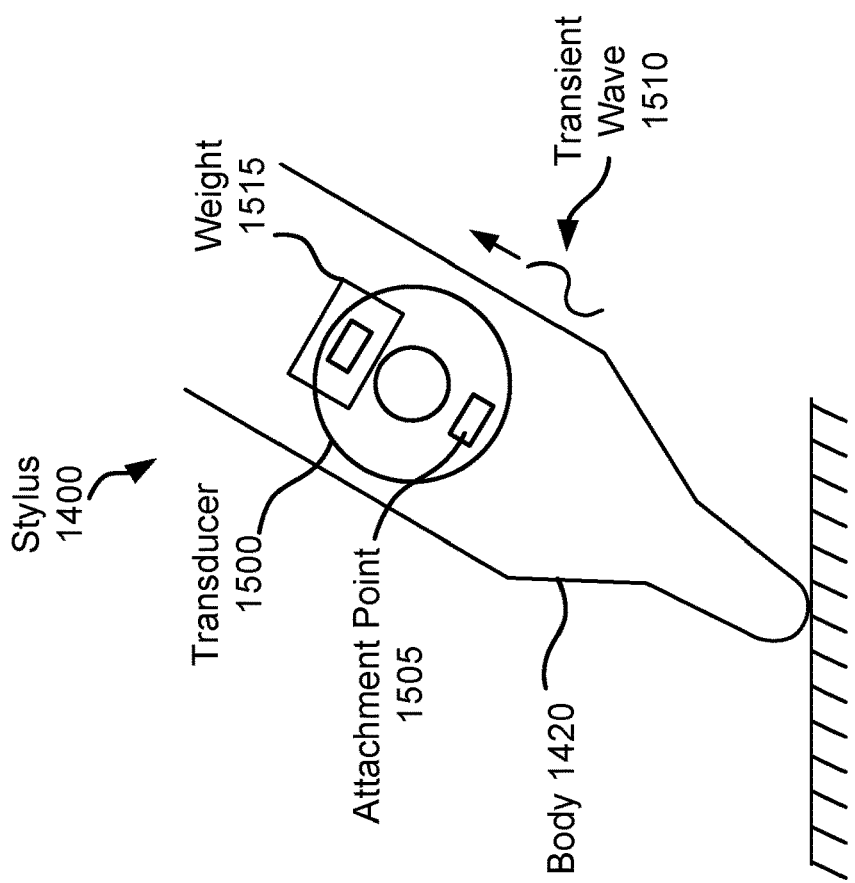
FIG. 15C (Front View)

STYLUS WITH CONTACT SENSOR

CROSS REFERENCE TO RELATED APPLICATIONS

This application claims the benefit of priority to U.S. Provisional Patent Application No. 62/769,494, "Active Instrument with Contact Detection Sensor", filed on Nov. 19, 2019, which is incorporated by reference.

BACKGROUND

1. Field of Art

This description generally relates to a stylus interacting with a surface of touch-sensitive device, and specifically to an active stylus with a contact detection sensor.

2. Description of the Related Art

Touch-sensitive displays for interacting with computing devices are becoming more common. A number of different technologies exist for implementing touch-sensitive displays and other touch-sensitive devices. Examples of these techniques include, for example, resistive touch screens, surface acoustic wave touch screens, capacitive touch screens and certain types of optical touch screens.

In some cases, touch-sensitive devices may mistakenly determine that a touch object is in contact with the touch-sensitive device before the object has physically contacted the touch-sensitive device. Since an ink pen does not write on a surface until it is in contact with the surface, it is desirable to confirm a touch object is in contact with the touch-sensitive device to provide an analogous user experience.

SUMMARY

A stylus for use with a touch-sensitive device includes a contact sensor and a reporting unit. The stylus may also include a contact detection controller. Alternatively, contact detection may be performed by the touch-sensitive device. The contact sensor measures one or more properties and the contact detection controller determines, based on measurements of the one or more properties from the contact sensor, whether the stylus is in contact with a surface. The reporting unit transmits an indication of whether the stylus is in contact with the surface to the touch-sensitive device.

In some embodiments, the contact detection controller is further configured to determine whether the surface with which the stylus is in contact is a touch surface of the touch device or another surface.

In some embodiments, the contact sensor includes conductive regions coupled to a tip of the stylus, and wherein the one or more properties measured by the contact sensor include an electrical signal from one or more of the conductive regions.

In some embodiments, the contact sensor includes a transducer and the one or more properties measured by the contact sensor include an electrical signal from the transducer. The surface may be a touch surface of the touch-sensitive device and the contact sensor may include a frequency filter that filters out electrical signals resulting from the stylus contacting another surface.

In some embodiments, the stylus further includes a body and a tip that is moveable relative to the body. The range of movement of the tip relative to the body may be between 100 nanometers and 250 micrometers. In one such embodiment, the contact sensor is a capacitive displacement sensor including a first, second, and third conductive plate. The first conductive plate and second conductive plate are coupled to the body. The third conductive plate is attached to the tip. An electrical signal is applied to the first conductive plate. The one or more properties measured by the contact sensor include an electrical signal from the second conductive plate.

In another such embodiment, the contact sensor is an inductive displacement sensor including a first conductive coil and a second conductive coil coupled to the body. The inductive displacement sensor also includes an inductive element coupled to the tip. A power source is configured to apply an electric signal to the first conductive coil. The one or more properties measured by the contact sensor include an electrical signal in the second conductive coil.

In a further such embodiment, the contact sensor includes an emitter, a detector, and a waveguide coupled to the body. The waveguide couples optical beams from the emitter to the detector. The one or more properties measured by the contact sensor includes an electrical signal from the detector. The electrical signal indicates an amount of light propagating in the waveguide to the detector. The amount of light propagating in the waveguide changes based the optical coupling between the waveguide and the tip. Alternatively, the contact sensor may include a grid, grating, or mesh instead of or in addition to the waveguide. The grid, grating, or mesh is coupled to the tip and placed between the emitter and detector. The one or more properties measured by the contact sensor include an electrical signal from the detector. The electrical signal indicates an amount of light propagating through the grid, grating, or mesh to the detector. The amount of light propagating through the grid, grating, or mesh is based on a position of the tip relative to the body.

In yet another such embodiment, the contact sensor includes a transducer coupled to the body and the tip. An electrical signal is applied to the transducer such that the tip vibrates. The one or more properties measured by the contact sensor include an amplitude or frequency of an electrical signal from the transducer.

Other embodiments relate to a system including a stylus and a touch device. The stylus includes a contact detection sensor and a reporting unit. The contact detection sensor is configured to measure one or more properties. The reporting unit is communicatively coupled to a contact detection controller and configured to transmit an indication of whether the stylus is in contact with a surface based on measurements from the contact sensor. The indication may be one or more measurements from the contact detection sensor or a signal indicating that the tip is in contact with the surface (in embodiments where the stylus includes a touch detection controller). The touch device includes the contact detection controller. The contact detection controller is configured to receive the indication from the contact sensor via the reporting unit and is configured to determine whether the stylus is in contact with a surface based on the indication.

BRIEF DESCRIPTION OF DRAWINGS

Embodiments of the present disclosure will now be described, by way of example, with reference to the accompanying drawings.

FIGS. 15A-D are cross-sectional views of a transducer connected to a stylus, according to some embodiments.

DETAILED DESCRIPTION

I. Introduction

A. Device Overview

Figure 1:
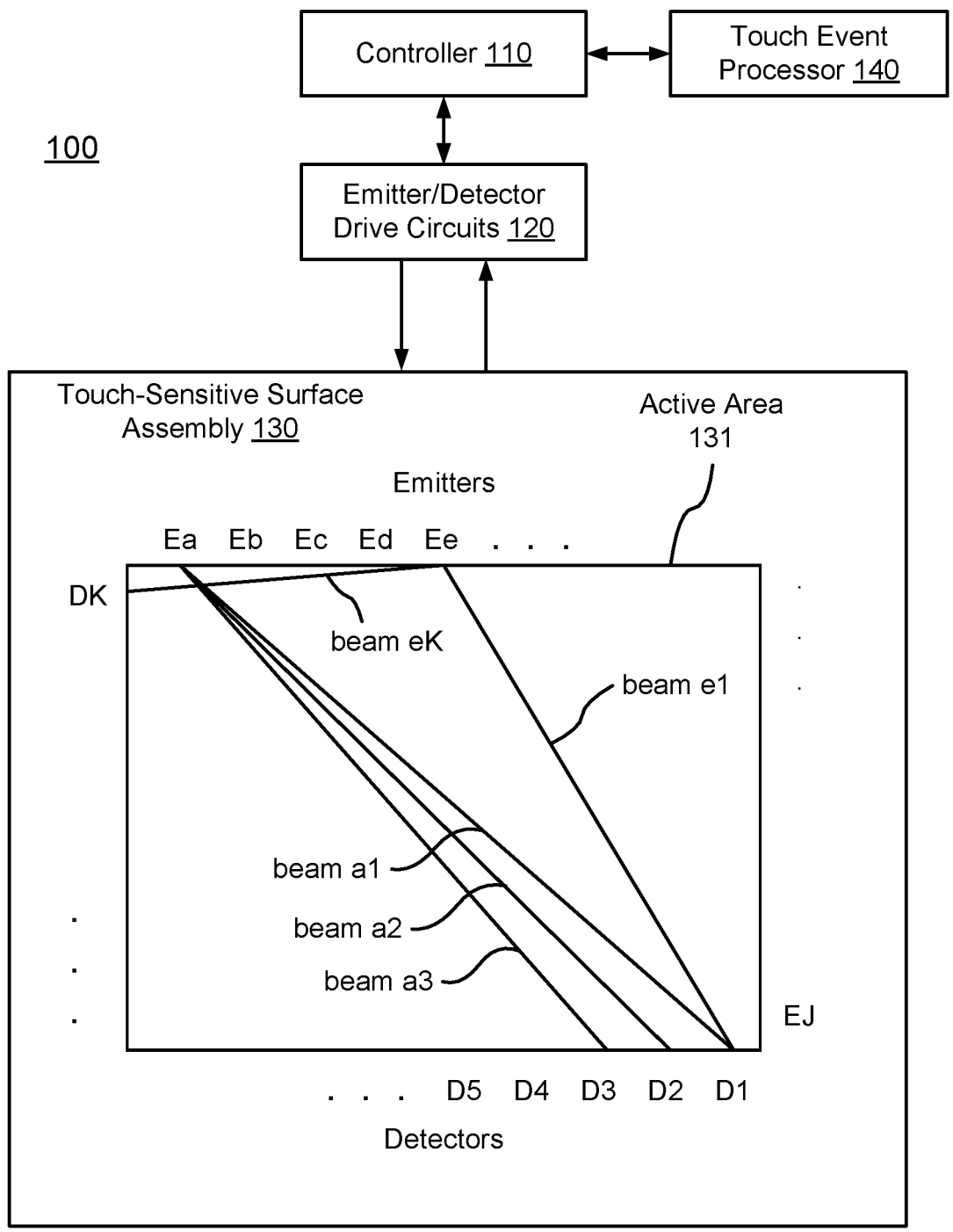
FIG. 1 is a diagram of an optical touch-sensitive device, according to an embodiment.

FIG. 1 is a diagram of an optical touch-sensitive device 100 (also referred to as a touch device 100), according to one embodiment. The optical touch-sensitive device 100 includes a controller 110, emitter/detector drive circuits 120, and a touch-sensitive surface assembly 130. The surface assembly 130 includes a surface 131 over which touch events are to be detected. For convenience, the area defined by surface 131 may sometimes be referred to as the active touch area, touch surface, or active touch surface, even though the surface itself may be an entirely passive structure. The assembly 130 also includes emitters and detectors arranged along the periphery of the active touch surface 131. In this example, there are J emitters labeled as Ea-EJ and K detectors labeled as D1-DK. The device also includes a touch event processor 140, which may be implemented as part of the controller 110 or separately as shown in FIG. 1. A standardized API may be used to communicate with the touch event processor 140, for example between the touch event processor 140 and controller 110, or between the touch event processor 140 and other devices connected to the touch event processor.

The emitter/detector drive circuits 120 serve as an interface between the controller 110 and the emitters Ej and detectors Dk. The emitters produce optical "beams" which are received by the detectors. Preferably, the light produced by one emitter is received by more than one detector, and each detector receives light from more than one emitter. For convenience, "beam" will refer to the light from one emitter to one detector, even though it may be part of a large fan of light that goes to many detectors rather than a separate beam. The beam from emitter Ej to detector Dk will be referred to as beam jk. FIG. 1 expressly labels beams a1, a2, a3, e1 and eK as examples. Touches within the active touch area 131 will disturb certain beams, thus changing what is received at the detectors Dk. Data about these changes is communicated to the touch event processor 140, which analyzes the data to determine the location(s) (and times) of touch events on surface 131.

The emitters and detectors may be interleaved around the periphery of the sensitive surface. In other embodiments, the number of emitters and detectors are different and are distributed around the periphery in any defined order. The emitters and detectors may be regularly or irregularly spaced. In some cases, the emitters and/or detectors may be located on less than all of the sides (e.g., one side). In some embodiments, the emitters and/or detectors are not located around the periphery (e.g., beams are directed to/from the active touch area 131 by optical beam couplers). Reflectors may also be positioned around the periphery to reflect optical beams, causing the path from the emitter to the detector to pass across the surface more than once.

One advantage of an optical approach as shown in FIG. 1 is that this approach scales well to larger screen sizes compared to conventional touch devices that cover an active touch area with sensors, such as resistive and capacitive sensors. Since the emitters and detectors may be positioned around the periphery, increasing the screen size by a linear factor of N means that the periphery also scales by a factor of N compared to $N^2$ for conventional touch devices.

B. Process Overview

Figure 2:
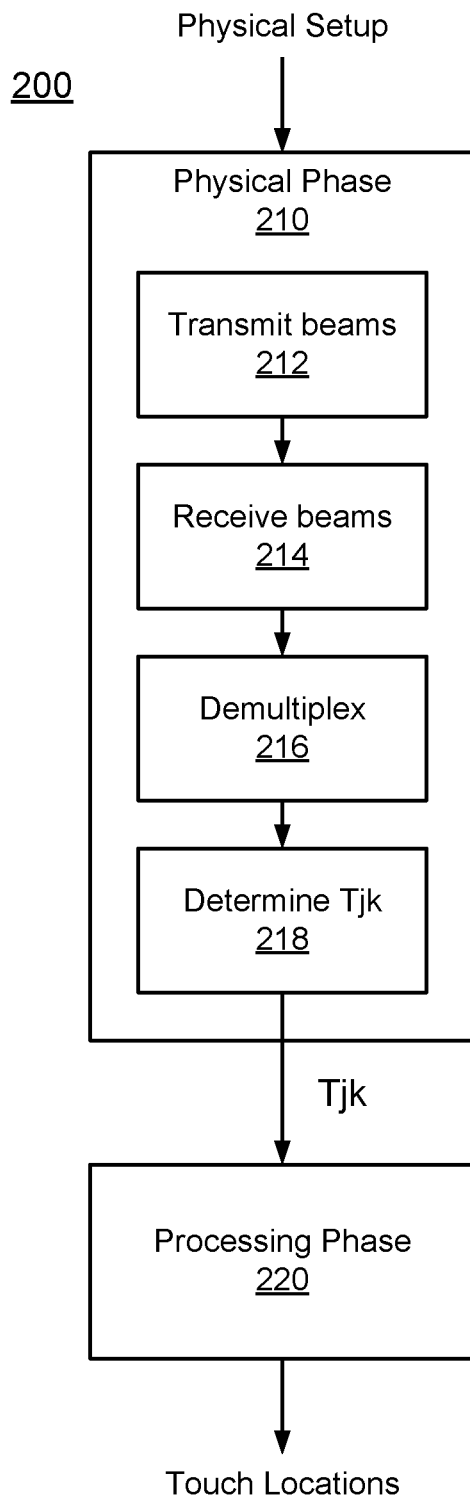
FIG. 2 is a flow diagram for determining the characteristics of touch events, according to an embodiment.

FIG. 2 is a flow diagram for determining the characteristics of touch events, according to an embodiment. This process will be illustrated using the device of FIG. 1. The process 200 is roughly divided into two phases, which will be referred to as a physical phase 210 and a processing phase 220. Conceptually, the dividing line between the two phases is a set of transmission coefficients Tjk (also referred to as transmission values Tjk).

The transmission coefficient Tjk is the transmittance of the optical beam from emitter j to detector k, compared to what would have been transmitted if there was no touch event interacting with the optical beam. In the following examples, we will use a scale of 0 (fully blocked beam) to 1 (fully transmitted beam). Thus, a beam jk that is undisturbed by a touch event has Tjk=1. A beam jk that is fully blocked by a touch event has a Tjk=0. A beam jk that is partially blocked or attenuated by a touch event has 0<Tjk<1. It is possible for Tjk>1, for example depending on the nature of the touch interaction or in cases where light is deflected or scattered to detectors k that it normally would not reach.

The use of this specific measure is purely an example. Other measures can be used. In particular, since we are most interested in interrupted beams, an inverse measure such as (1−Tjk) may be used since it is normally 0. Other examples include measures of absorption, attenuation, reflection, or scattering. In addition, although FIG. 2 is explained using Tjk as the dividing line between the physical phase 210 and the processing phase 220, it is not required that Tjk be expressly calculated. Nor is a clear division between the physical phase 210 and processing phase 220 required.

Returning to FIG. 2, the physical phase 210 is the process of determining the Tjk from the physical setup. The processing phase 220 determines the touch events from the Tjk. The model shown in FIG. 2 is conceptually useful because it somewhat separates the physical setup and underlying physical mechanisms from the subsequent processing.

For example, the physical phase 210 produces transmission coefficients Tjk. Many different physical designs for the touch-sensitive surface assembly 130 are possible, and different design tradeoffs will be considered depending on the end application. For example, the emitters and detectors may be narrower or wider, narrower angle or wider angle, various wavelengths, various powers, coherent or not, etc. As another example, different types of multiplexing may be used to allow beams from multiple emitters to be received by each detector. Several of these physical setups and manners of operation are described below, primarily in Section II.

The interior of block 210 shows one possible implementation of process 210. In this example, emitters transmit 212 beams to multiple detectors. Some of the beams travelling across the touch-sensitive surface are disturbed by touch events. The detectors receive 214 the beams from the emitters in a multiplexed optical form. The received beams are de-multiplexed 216 to distinguish individual beams jk from each other. Transmission coefficients Tjk for each individual beam jk are then determined 218.

The processing phase 220 computes the touch characteristics and can be implemented in many different ways. Candidate touch points, line imaging, location interpolation, touch event templates and multi-pass approaches are all examples of techniques that may be used to compute the touch characteristics (such as touch location and touch strength) as part of the processing phase 220. Several of these are identified in Section III.

II. Physical Set-up

The touch-sensitive device 100 may be implemented in a number of different ways. The following are some examples of design variations.

A. Electronics

With respect to electronic aspects, note that FIG. 1 is exemplary and functional in nature. Functions from different boxes in FIG. 1 can be implemented together in the same component.

For example, the controller 110 and touch event processor 140 may be implemented as hardware, software or a combination of the two. They may also be implemented together (e.g., as an SoC with code running on a processor in the SoC) or separately (e.g., the controller as part of an ASIC, and the touch event processor as software running on a separate processor chip that communicates with the ASIC). Example implementations include dedicated hardware (e.g., ASIC or programmed field programmable gate array (FPGA)), and microprocessor or microcontroller (either embedded or standalone) running software code (including firmware). Software implementations can be modified after manufacturing by updating the software.

The emitter/detector drive circuits 120 serve as an interface between the controller 110 and the emitters and detectors. In one implementation, the interface to the controller 110 is at least partly digital in nature. With respect to emitters, the controller 110 may send commands controlling the operation of the emitters. These commands may be instructions, for example a sequence of bits which mean to take certain actions: start/stop transmission of beams, change to a certain pattern or sequence of beams, adjust power, power up/power down circuits. They may also be simpler signals, for example a "beam enable signal," where the emitters transmit beams when the beam enable signal is high and do not transmit when the beam enable signal is low.

The circuits 120 convert the received instructions into physical signals that drive the emitters. For example, circuit 120 might include some digital logic coupled to digital to analog converters, in order to convert received digital instructions into drive currents for the emitters. The circuit 120 might also include other circuitry used to operate the emitters: modulators to impress electrical modulations onto the optical beams (or onto the electrical signals driving the emitters), control loops and analog feedback from the emitters, for example. The emitters may also send information to the controller, for example providing signals that report on their current status.

With respect to the detectors, the controller 110 may also send commands controlling the operation of the detectors, and the detectors may return signals to the controller. The detectors also transmit information about the beams received by the detectors. For example, the circuits 120 may receive raw or amplified analog signals from the detectors. The circuits then may condition these signals (e.g., noise suppression), convert them from analog to digital form, and perhaps also apply some digital processing (e.g., demodulation).

B. Touch Interactions

Not all touch objects are equally good beam attenuators, as indicated by their transmission coefficient Tjk. Beam attenuation mainly depends on the optical transparency of the object and the volume of the object portion that is interacting with the beam, i.e. the object portion that intersects the beam propagation volume.

Figure 3A:
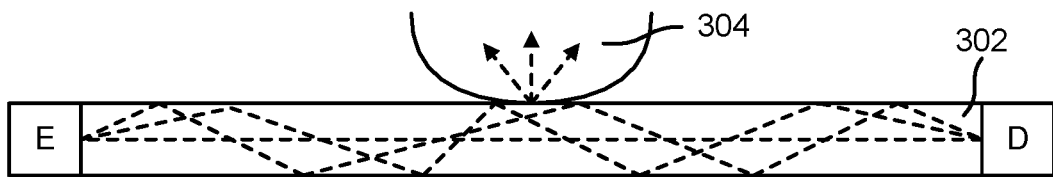
FIG. 3A-3F illustrate example mechanisms for a touch interaction with an optical beam, according to some embodiments.

FIGS. 3A-3F illustrate different mechanisms for a touch interaction with an optical beam. FIG. 3A illustrates a mechanism based on frustrated total internal reflection (TIR). The optical beam, shown as a dashed line, travels from emitter E to detector D through an optically transparent planar waveguide 302. The beam is confined to the waveguide 302 by total internal reflection. The waveguide may be constructed of plastic or glass, for example. An object 304, such as a finger or stylus, coming into contact with the transparent waveguide 302, has a higher refractive index than the air normally surrounding the waveguide. Over the area of contact, the increase in the refractive index due to the object disturbs the total internal reflection of the beam within the waveguide. The disruption of total internal reflection increases the light leakage from the waveguide, attenuating any beams passing through the contact area. Correspondingly, removal of the object 304 will stop the attenuation of the beams passing through. Attenuation of the beams passing through the touch point will result in less power at the detectors, from which the reduced transmission coefficients Tjk can be calculated.

Figure 3B:

FIG. 3B illustrates a mechanism based on beam blockage (also referred to as an "over the surface" (OTS) configuration). Emitters produce beams which are in close proximity to a surface 306. An object 304 coming into contact with the surface 306 will partially or entirely block beams within the contact area. FIGS. 3A and 3B illustrate two physical mechanisms for touch interactions, but other mechanisms can also be used. For example, the touch interaction may be based on changes in polarization, scattering, or changes in propagation direction or propagation angle (either vertically or horizontally).

Figure 3C:
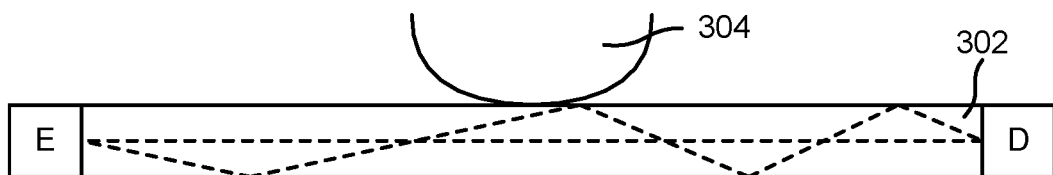

For example, FIG. 3C illustrates a different mechanism based on propagation angle. In this example, the optical beam is guided in a waveguide 302 via TIR. The optical beam hits the waveguide-air interface at a certain angle and is reflected back at the same angle. However, the touch 304 changes the angle at which the optical beam is propagating, and may also absorb some of the incident light. In FIG. 3C, the optical beam travels at a steeper angle of propagation after the touch 304. Note that changing the angle of the light may also cause it to fall below the critical angle for total internal reflection, whereby it will leave the waveguide. The detector D has a response that varies as a function of the angle of propagation. The detector D could be more sensitive to the optical beam travelling at the original angle of propagation or it could be less sensitive. Regardless, an optical beam that is disturbed by a touch 304 will produce a different response at detector D.

Figure 3D:
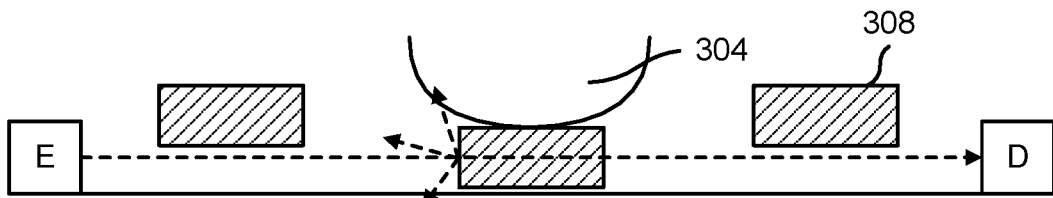

In FIGS. 3A-3C, the touching object was also the object that interacted with the beam. This will be referred to as a direct interaction. In an indirect interaction, the touching object interacts with an intermediate object, which interacts with the optical beam. FIG. 3D shows an example that uses intermediate blocking structures 308. Normally, these structures 308 do not block the beam. However, in FIG. 3D, object 304 contacts the blocking structure 308, which causes it to partially or entirely block the optical beam. In FIG. 3D, the structures 308 are shown as discrete objects, but they do not have to be so.

Figure 3E:
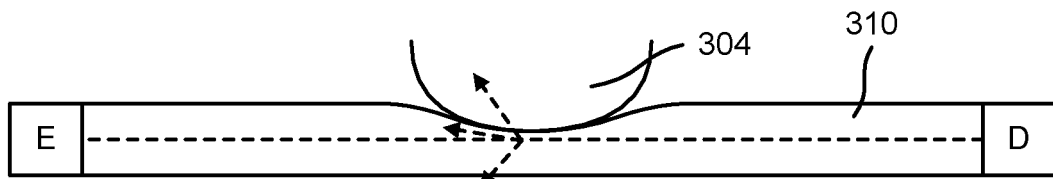

In FIG. 3E, the intermediate structure 310 is a compressible, partially transmitting sheet. When there is no touch, the sheet attenuates the beam by a certain amount. In FIG. 3E, the touch 304 compresses the sheet, thus changing the attenuation of the beam. For example, the upper part of the sheet may be more opaque than the lower part, so that compression decreases the transmittance. Alternatively, the sheet may have a certain density of scattering sites. Compression increases the density in the contact area, since the same number of scattering sites occupies a smaller volume, thus decreasing the transmittance. Analogous indirect approaches can also be used for frustrated TIR. Note that this approach could be used to measure contact pressure or touch velocity, based on the degree or rate of compression.

The touch mechanism may also enhance transmission, instead of or in addition to reducing transmission. For example, the touch interaction in FIG. 3E might increase the transmission instead of reducing it. The upper part of the sheet may be more transparent than the lower part, so that compression increases the transmittance.

Figure 3F:
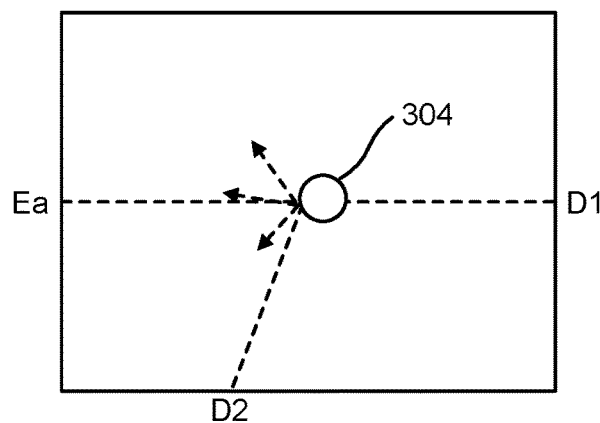

FIG. 3F shows another example where the transmittance between an emitter and detector increases due to a touch interaction. FIG. 3F is a top view. Emitter Ea normally produces a beam that is received by detector D1. When there is no touch interaction, Ta1=1 and Ta2=0. However, a touch interaction 304 blocks the beam from reaching detector D1 and scatters some of the blocked light to detector D2. Thus, detector D2 receives more light from emitter Ea than it normally would. Accordingly, when there is a touch event 304, Ta1 decreases and Ta2 increases.

For simplicity, in the remainder of this description, the touch mechanism will be assumed to be primarily of a blocking nature, meaning that a beam from an emitter to a detector will be partially or fully blocked by an intervening touch event. This is not required, but it is convenient to illustrate various concepts.

For convenience, the touch interaction mechanism may sometimes be classified as either binary or analog. A binary interaction is one that basically has two possible responses as a function of the touch. Examples includes non-blocking and fully blocking, or non-blocking and 10%+ attenuation, or not frustrated and frustrated TIR. An analog interaction is one that has a "grayscale" response to the touch: non-blocking passing through gradations of partially blocking to blocking. Whether the touch interaction mechanism is binary or analog depends in part on the nature of the interaction between the touch and the beam. It does not depend on the lateral width of the beam (which can also be manipulated to obtain a binary or analog attenuation, as described below), although it might depend on the vertical size of the beam.

Figure 4:
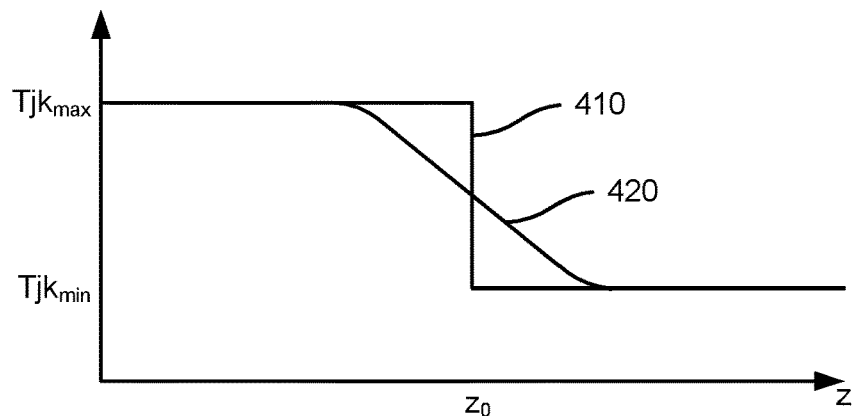
FIG. 4 is a graph of binary and analog touch interactions, according to an embodiment.

FIG. 4 is a graph illustrating a binary touch interaction mechanism compared to an analog touch interaction mechanism. FIG. 4 graphs the transmittance Tjk as a function of the depth z of the touch. The dimension z is into and out of the active touch surface. Curve 410 is a binary response. At low z (i.e., when the touch has not yet disturbed the beam), the transmittance Tjk is at its maximum. However, at some point z0, the touch breaks the beam and the transmittance Tjk falls fairly suddenly to its minimum value. Curve 420 shows an analog response where the transition from maximum Tjk to minimum Tjk occurs over a wider range of z. If curve 420 is well behaved, it is possible to estimate z from the measured value of Tjk.

C. Emitters, Detectors and Couplers

Each emitter transmits light to a number of detectors. Usually, each emitter outputs light to more than one detector simultaneously. Similarly, each detector may receive light from a number of different emitters. The optical beams may be visible, infrared (IR) and/or ultraviolet light. The term "light" is meant to include all of these wavelengths and terms such as "optical" are to be interpreted accordingly.

Examples of the optical sources for the emitters include light emitting diodes (LEDs) and semiconductor lasers. IR sources can also be used. Modulation of optical beams can be achieved by directly modulating the optical source or by using an external modulator, for example a liquid crystal modulator or a deflected mirror modulator. Examples of sensor elements for the detector include charge coupled devices, photodiodes, photoresistors, phototransistors, and nonlinear all-optical detectors. Typically, the detectors output an electrical signal that is a function of the intensity of the received optical beam.

The emitters and detectors may also include optics and/or electronics in addition to the main optical source and sensor element. For example, optics can be used to couple between the emitter/detector and the desired beam path. Optics can also reshape or otherwise condition the beam produced by the emitter or accepted by the detector. These optics may include lenses, Fresnel lenses, mirrors, filters, non-imaging optics and other optical components.

In this disclosure, the optical paths are shown unfolded for clarity. Thus, sources, optical beams and sensors are shown as lying in one plane. In actual implementations, the sources and sensors typically do not lie in the same plane as the optical beams. Various coupling approaches can be used. For example, a planar waveguide or optical fiber may be used to couple light to/from the actual beam path. Free space coupling (e.g., lenses and mirrors) may also be used. A combination may also be used, for example waveguided along one dimension and free space along the other dimension. Various coupler designs are described in U.S. Pat. No. 9,170,683, entitled "Optical Coupler," which is incorporated by reference herein.

D. Optical Beam Paths

Figures 5A, 5B, 5C:
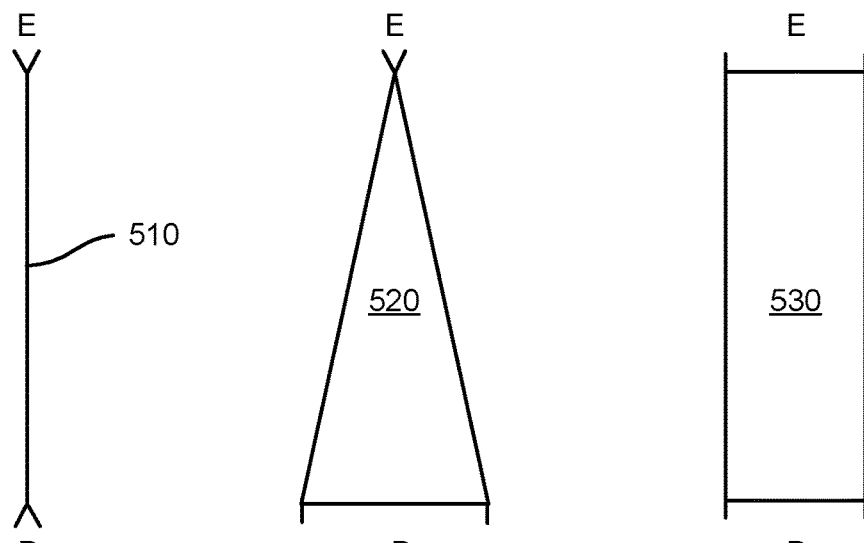
FIGS. 5A-5C are top views of differently shaped beam footprints, according to some embodiments.

Another aspect of a touch-sensitive system is the shape and location of the optical beams and beam paths. In FIG. 1, the optical beams are shown as lines. These lines should be interpreted as representative of the beams, but the beams themselves are not necessarily narrow pencil beams. FIGS. 5A-5C illustrate different beam shapes when projected onto the active touch surface (beam footprint).

FIG. 5A shows a point emitter E, point detector D and a narrow "pencil" beam 510 from the emitter to the detector. In FIG. 5B, a point emitter E produces a fan-shaped beam 520 received by the wide detector D. In FIG. 5C, a wide emitter E produces a "rectangular" beam 530 received by the wide detector D. These are top views of the beams and the shapes shown are the footprints of the beam paths. Thus, beam 510 has a line-like footprint, beam 520 has a triangular footprint which is narrow at the emitter and wide at the detector, and beam 530 has a fairly constant width rectangular footprint. In FIG. 5, the detectors and emitters are represented by their widths, as seen by the beam path. The actual optical sources and sensors may not be so wide. Rather, optics (e.g., cylindrical lenses or mirrors) can be used to effectively widen or narrow the lateral extent of the actual sources and sensors.

Figure 6A:
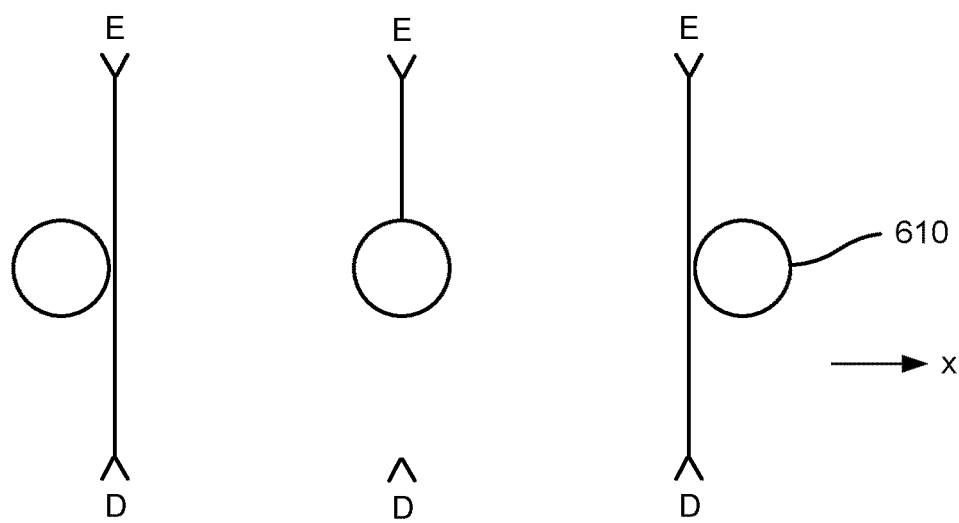
FIGS. 6A-6B are top views illustrating a touch point travelling through a narrow beam and a wide beam, respectively, according to some embodiments.
Figure 6B:
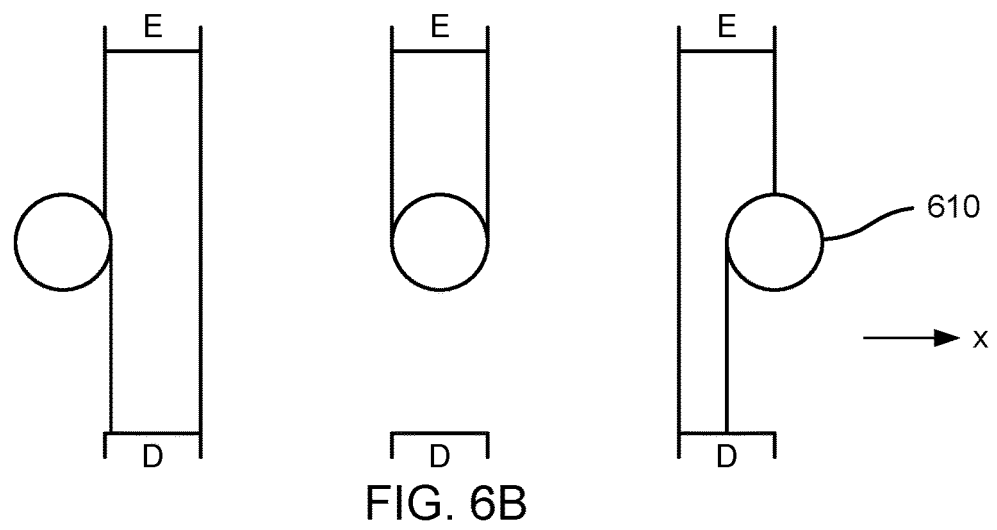
Figure 7:
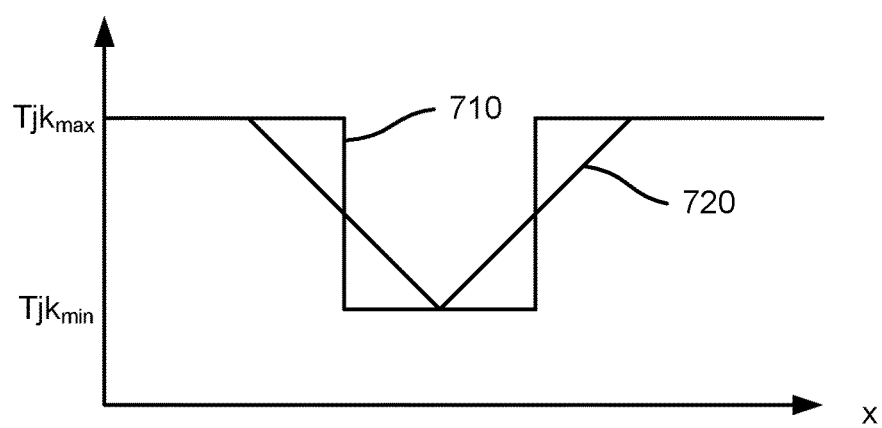
FIG. 7 is a graph of the binary and analog responses for the narrow and wide beams of FIG. 6, according to some embodiments.

FIGS. 6A-6B and 7 show, for a constant z position and various x positions, how the width of the footprint can determine whether the transmission coefficient Tjk behaves as a binary or analog quantity. In these figures, a touch point has contact area 610. Assume that the touch is fully blocking, so that any light that hits contact area 610 will be blocked. FIG. 6A shows what happens as the touch point moves left to right past a narrow beam. In the leftmost situation, the beam is not blocked at all (i.e., maximum Tjk) until the right edge of the contact area 610 interrupts the beam. At this point, the beam is fully blocked (i.e., minimum Tjk), as is also the case in the middle scenario. It continues as fully blocked until the entire contact area moves through the beam. Then, the beam is again fully unblocked, as shown in the righthand scenario. Curve 710 in FIG. 7 shows the transmittance Tjk as a function of the lateral position x of the contact area 610. The sharp transitions between minimum and maximum Tjk show the binary nature of this response.

FIG. 6B shows what happens as the touch point moves left to right past a wide beam. In the leftmost scenario, the beam is just starting to be blocked. The transmittance Tjk starts to fall off but is at some value between the minimum and maximum values. The transmittance Tjk continues to fall as the touch point blocks more of the beam, until the middle situation where the beam is fully blocked. Then the transmittance Tjk starts to increase again as the contact area exits the beam, as shown in the righthand situation. Curve 720 in FIG. 7 shows the transmittance Tjk as a function of the lateral position x of the contact area 610. The transition over a broad range of x shows the analog nature of this response.

E. Active Area Coverage

Figure 8A:
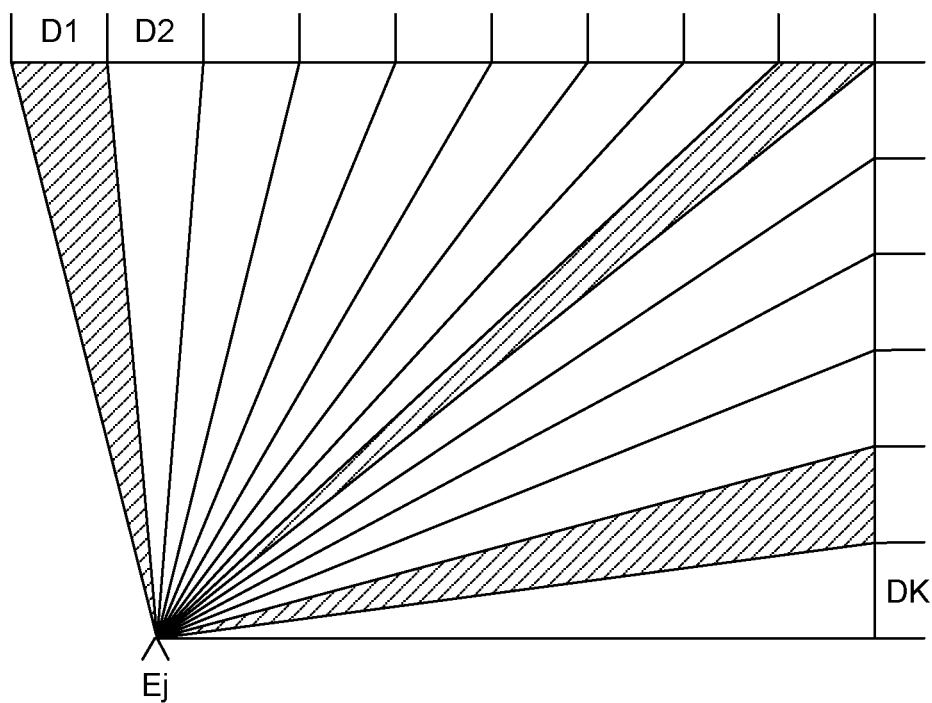
FIGS. 8A and 8B are top views illustrating active touch area coverage by emitters, according to some embodiments.
Figure 8B:
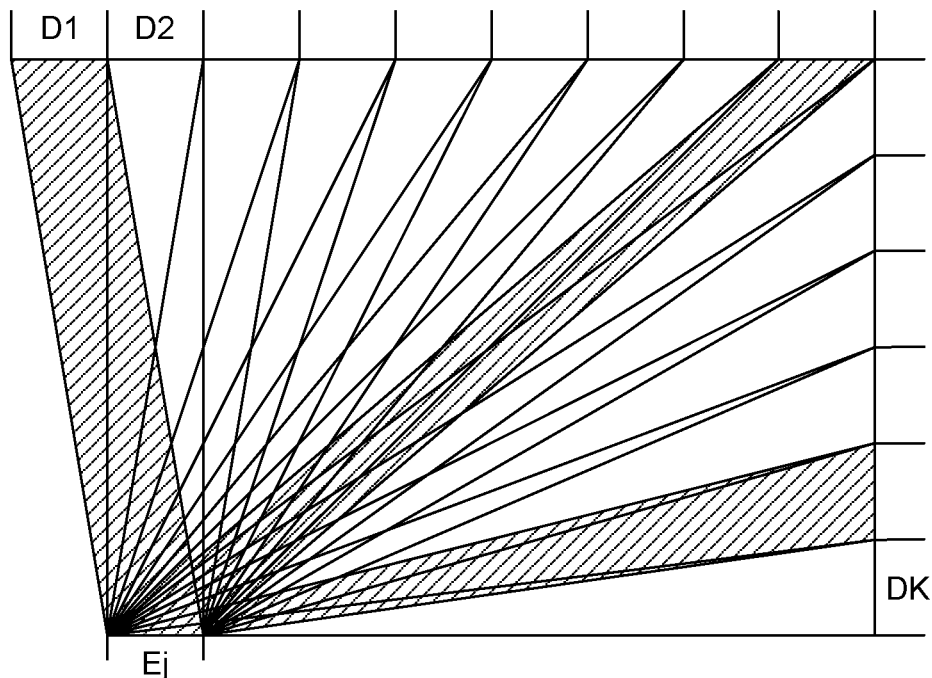

FIG. 8A is a top view illustrating the beam pattern produced by a point emitter. Emitter Ej transmits beams to wide detectors D1-DK. Three beams are shaded for clarity: beam j1, beam j(K-1) and an intermediate beam. Each beam has a fan-shaped footprint. The aggregate of all footprints is emitter Ej's coverage area. That is, any touch event that falls within emitter Ej's coverage area will disturb at least one of the beams from emitter Ej. FIG. 8B is a similar diagram, except that emitter Ej is a wide emitter and produces beams with "rectangular" footprints (actually, trapezoidal but they are referred to as rectangular for convenience). The three shaded beams are for the same detectors as in FIG. 8A.

Note that every emitter Ej may not produce beams for every detector Dk. In FIG. 1, consider beam path aK which would go from emitter Ea to detector DK. First, the light produced by emitter Ea may not travel in this direction (i.e., the radiant angle of the emitter may not be wide enough) so there may be no physical beam at all, or the acceptance angle of the detector may not be wide enough so that the detector does not detect the incident light. Second, even if there was a beam and it was detectable, it may be ignored because the beam path is not located in a position to produce useful information. Hence, the transmission coefficients Tjk may not have values for all combinations of emitters Ej and detectors Dk.

The footprints of individual beams from an emitter and the coverage area of all beams from an emitter can be described using different quantities. Spatial extent (i.e., width), angular extent (i.e., radiant angle for emitters, acceptance angle for detectors), and footprint shape are quantities that can be used to describe individual beam paths as well as an individual emitter's coverage area.

An individual beam path from one emitter Ej to one detector Dk can be described by the emitter Ej's width, the detector Dk's width and/or the angles and shape defining the beam path between the two.

These individual beam paths can be aggregated over all detectors for one emitter Ej to produce the coverage area for emitter Ej. Emitter Ej's coverage area can be described by the emitter Ej's width, the aggregate width of the relevant detectors Dk and/or the angles and shape defining the aggregate of the beam paths from emitter Ej. Note that the individual footprints may overlap (see FIG. 8B close to the emitter). Therefore, an emitter's coverage area may not be equal to the sum of its footprints. The ratio of (the sum of an emitter's footprints)/(emitter's cover area) is one measure of the amount of overlap.

The coverage areas for individual emitters can be aggregated over all emitters to obtain the overall coverage for the system. In this case, the shape of the overall coverage area is not so interesting because it should cover the entirety of the active touch area 131. However, not all points within the active touch area 131 will be covered equally. Some points may be traversed by many beam paths while other points traversed by far fewer. The distribution of beam paths over the active touch area 131 may be characterized by calculating how many beam paths traverse different (x,y) points within the active touch area. The orientation of beam paths is another aspect of the distribution. An (x,y) point that is derived from three beam paths that are all running roughly in the same direction usually will be a weaker distribution than a point that is traversed by three beam paths that all run at 60 degree angles to each other.

Figure 8C:
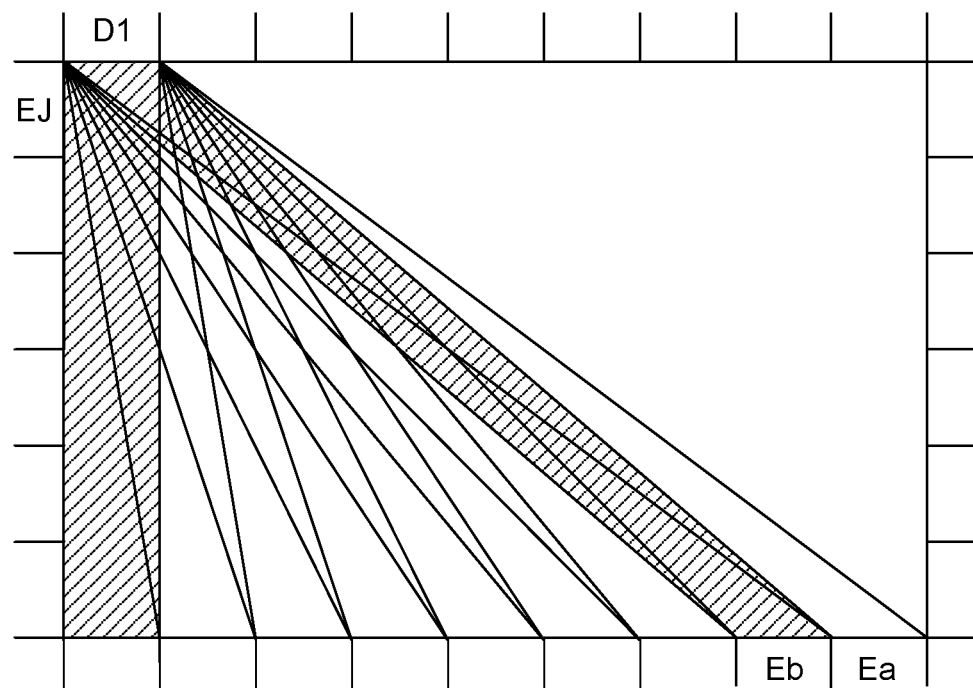
FIGS. 8C and 8D are top views illustrating active touch area coverage by detectors, according to some embodiments.
Figure 8D:
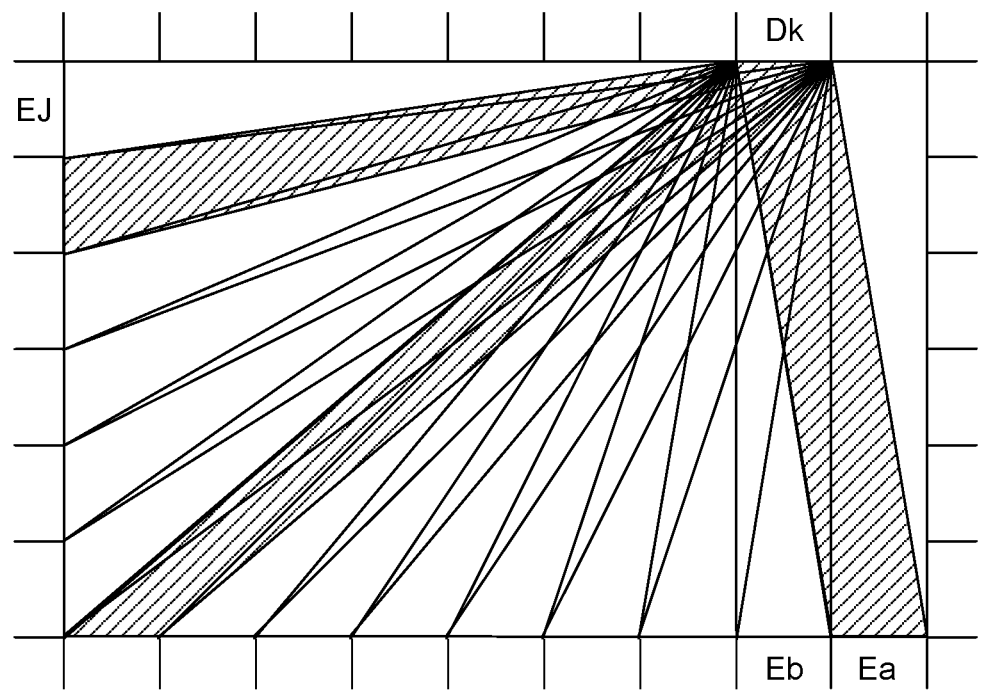

The discussion above for emitters also holds for detectors. The diagrams constructed for emitters in FIGS. 8A-8B can also be constructed for detectors. For example, FIG. 8C shows a similar diagram for detector D1 of FIG. 8B. That is, FIG. 8C shows all beam paths received by detector D1. Note that in this example, the beam paths to detector D1 are only from emitters along the bottom edge of the active touch area. The emitters on the left edge are not worth connecting to D1 and there are no emitters on the right edge (in this example design). FIG. 8D shows a diagram for detector Dk, which is an analogous position to emitter Ej in FIG. 8B.

A detector Dk's coverage area is then the aggregate of all footprints for beams received by a detector Dk. The aggregate of all detector coverage areas gives the overall system coverage.

The coverage of the active touch area 131 depends on the shapes of the beam paths, but also depends on the arrangement of emitters and detectors. In most applications, the active touch area is rectangular in shape, and the emitters and detectors are located along the four edges of the rectangle.

Figure 8E:
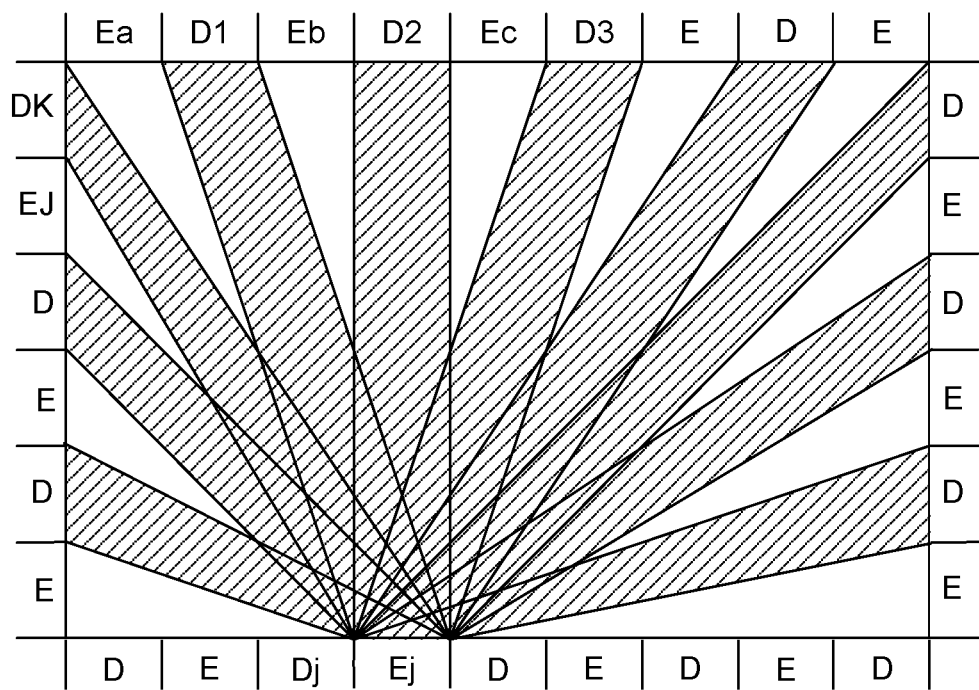
FIG. 8E is a top view illustrating alternating emitters and detectors, according to an embodiment.

In a preferred approach, rather than having only emitters along certain edges and only detectors along the other edges, emitters and detectors are interleaved along the edges. FIG. 8E shows an example of this where emitters and detectors are alternated along all four edges. The shaded beams show the coverage area for emitter Ej.

F. Multiplexing

Since multiple emitters transmit multiple optical beams to multiple detectors, and since the behavior of individual beams is generally desired, a multiplexing/demultiplexing scheme is used. For example, each detector typically outputs a single electrical signal indicative of the intensity of the incident light, regardless of whether that light is from one optical beam produced by one emitter or from many optical beams produced by many emitters. However, the transmittance Tjk is a characteristic of an individual optical beam jk.

Different types of multiplexing can be used. Depending upon the multiplexing scheme used, the transmission characteristics of beams, including their content and when they are transmitted, may vary. Consequently, the choice of multiplexing scheme may affect both the physical construction of the optical touch-sensitive device as well as its operation.

One approach is based on code division multiplexing. In this approach, the optical beams produced by each emitter are encoded using different codes. A detector receives an optical signal which is the combination of optical beams from different emitters, but the received beam can be separated into its components based on the codes. This is described in further detail in U.S. Pat. No. 8,227,742, entitled "Optical Control System With Modulated Emitters," which is incorporated by reference herein.

Another similar approach is frequency division multiplexing. In this approach, rather than modulated by different codes, the optical beams from different emitters are modulated by different frequencies. The frequencies are low enough that the different components in the detected optical beam can be recovered by electronic filtering or other electronic or software means.

Time division multiplexing can also be used. In this approach, different emitters transmit beams at different times. The optical beams and transmission coefficients Tjk are identified based on timing. If only time multiplexing is used, the controller cycles through the emitters quickly enough to meet a specified touch sampling rate.

Other multiplexing techniques commonly used with optical systems include wavelength division multiplexing, polarization multiplexing, spatial multiplexing and angle multiplexing. Electronic modulation schemes, such as PSK, QAM and OFDM, may also be possibly applied to distinguish different beams.

Several multiplexing techniques may be used together. For example, time division multiplexing and code division multiplexing could be combined. Rather than code division multiplexing 128 emitters or time division multiplexing 128 emitters, the emitters might be broken down into 8 groups of 16. The 8 groups are time division multiplexed so that only 16 emitters are operating at any one time, and those 16 emitters are code division multiplexed. This might be advantageous, for example, to minimize the number of emitters active at any given point in time to reduce the power requirements of the device.

III. Processing Phase

In the processing phase 220 of FIG. 2, the transmission coefficients Tjk are used to determine the locations of touch points. Different approaches and techniques can be used, including candidate touch points, line imaging, location interpolation, touch event templates, multi-pass processing and beam weighting.

A. Candidate Touch Points

One approach to determine the location of touch points is based on identifying beams that have been affected by a touch event (based on the transmission coefficients Tjk) and then identifying intersections of these interrupted beams as candidate touch points. The list of candidate touch points can be refined by considering other beams that are in proximity to the candidate touch points or by considering other candidate touch points. This approach is described in further detail in U.S. Pat. No. 8,350,831, "Method and Apparatus for Detecting a Multitouch Event in an Optical Touch-Sensitive Device," which is incorporated herein by reference.

B. Line Imaging

This technique is based on the concept that the set of beams received by a detector form a line image of the touch points, where the viewpoint is the detector's location. The detector functions as a one-dimensional camera that is looking at the collection of emitters. Due to reciprocity, the same is also true for emitters. The set of beams transmitted by an emitter form a line image of the touch points, where the viewpoint is the emitter's location.

FIGS. 9-10 illustrate this concept using the emitter/detector layout shown in FIGS. 8B-8D. For convenience, the term "beam terminal" will be used to refer to emitters and detectors. Thus, the set of beams from a beam terminal (which could be either an emitter or a detector) form a line image of the touch points, where the viewpoint is the beam terminal's location.

Figure 9A:
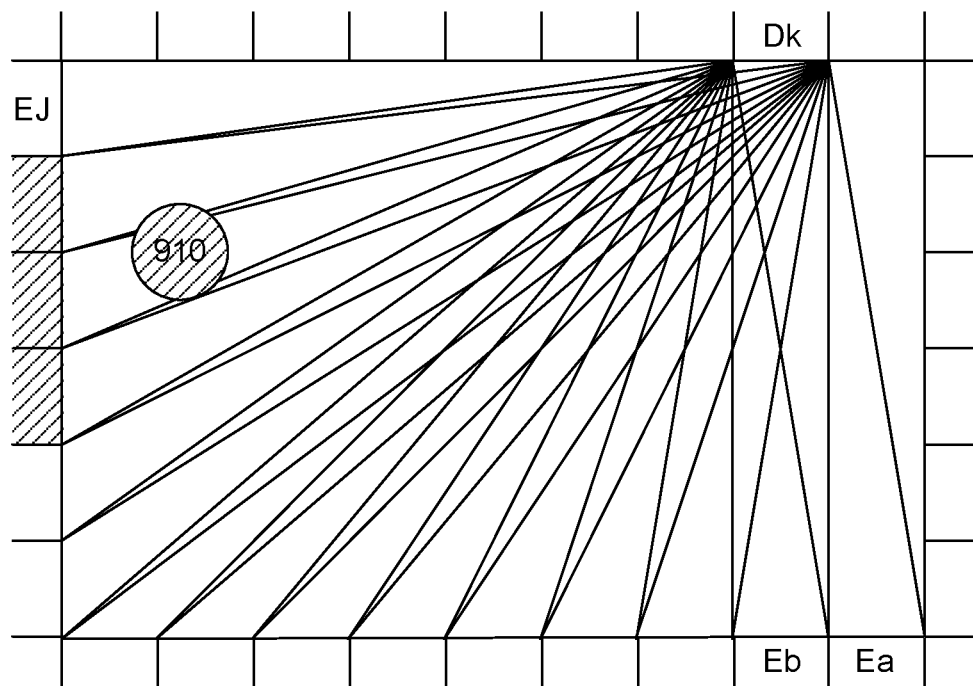
FIGS. 9A-9C are top views illustrating beam patterns interrupted by a touch point, from the viewpoint of different beam terminals, according to some embodiments.
Figure 9B:
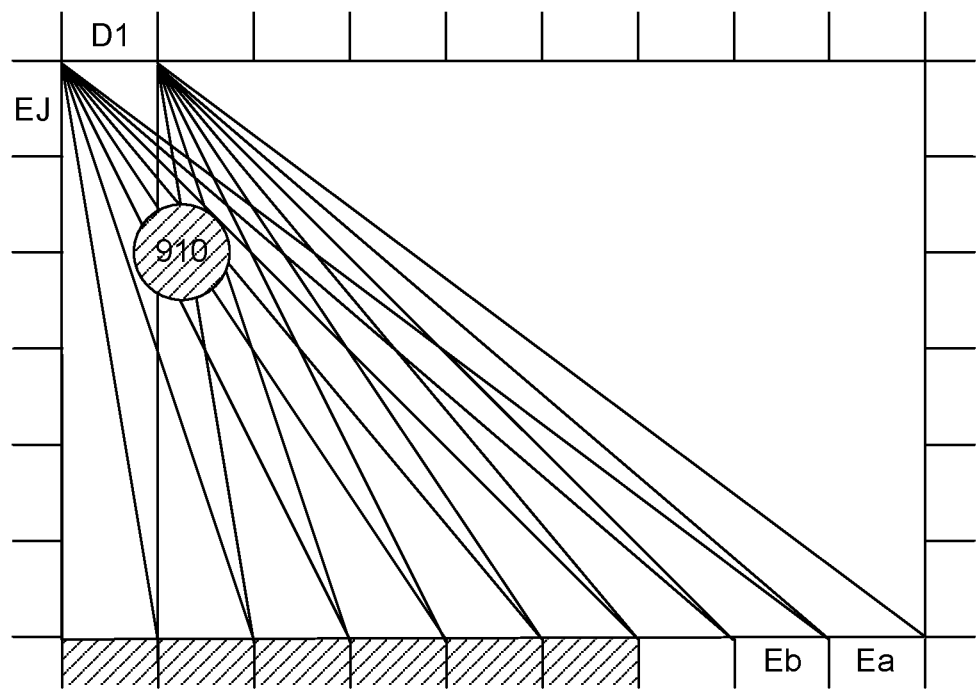
Figure 9C:
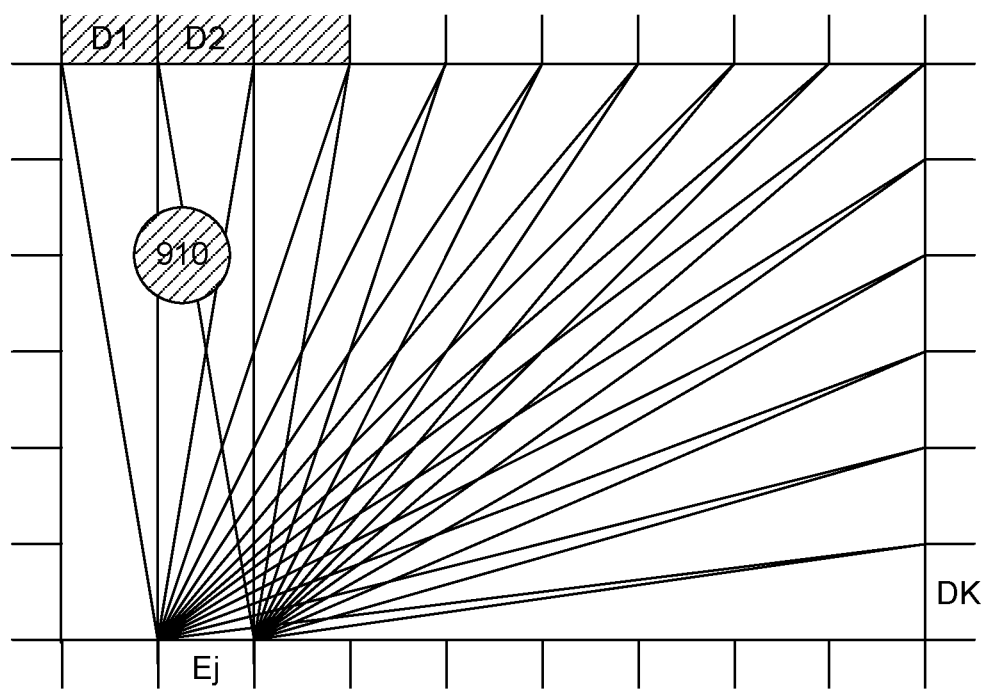
Figure 10A:
FIGS. 10A-10C are graphs of line images corresponding to the cases shown in FIGS. 9A-9C, according to some embodiments.

FIGS. 9A-C shows the physical set-up of active area, emitters and detectors. In this example, there is a touch point with contact area 910. FIG. 9A shows the beam pattern for beam terminal Dk, which are all the beams from emitters Ej to detector Dk. A shaded emitter indicates that beam is interrupted, at least partially, by the touch point 910. FIG. 10A shows the corresponding line image 1021 "seen" by beam terminal Dk. The beams to terminals Ea, Eb, ... E(J-4) are uninterrupted so the transmission coefficient is at full value. The touch point appears as an interruption to the beams with beam terminals E(J-3), E(J-2) and E(J-1), with the main blockage for terminal E(J-2). That is, the portion of the line image spanning beam terminals E(J-3) to E(J-1) is a one-dimensional image of the touch event.

Figure 10B:
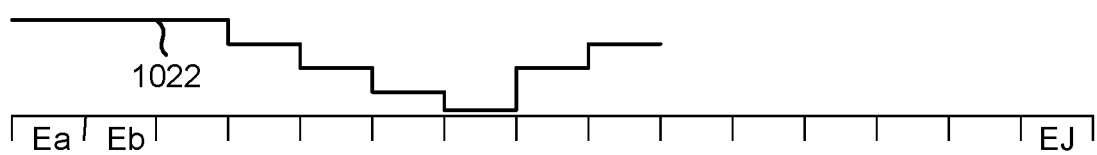
Figure 10C:
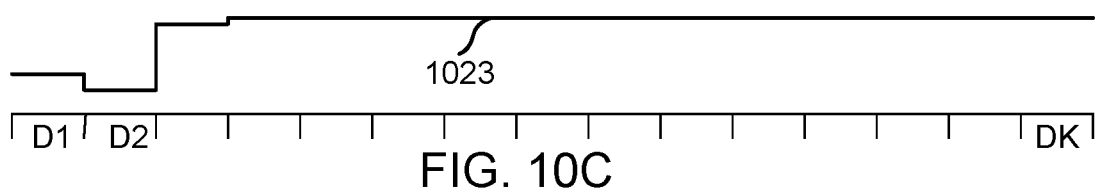

FIG. 9B shows the beam pattern for beam terminal D1 and FIG. 10B shows the corresponding line image 1022 seen by beam terminal D1. Note that the line image does not span all emitters because the emitters on the left edge of the active area do not form beam paths with detector D1. FIGS. 9C and 10C show the beam patterns and corresponding line image 1023 seen by beam terminal Ej.

The example in FIGS. 9-10 use wide beam paths. However, the line image technique may also be used with narrow or fan-shaped beam paths.

FIGS. 10A-C show different images of touch point 910. The location of the touch event can be determined by processing the line images. For example, approaches based on correlation or computerized tomography algorithms can be used to determine the location of the touch event 910. However, simpler approaches are preferred because they require less compute resources.

Figure 9D:
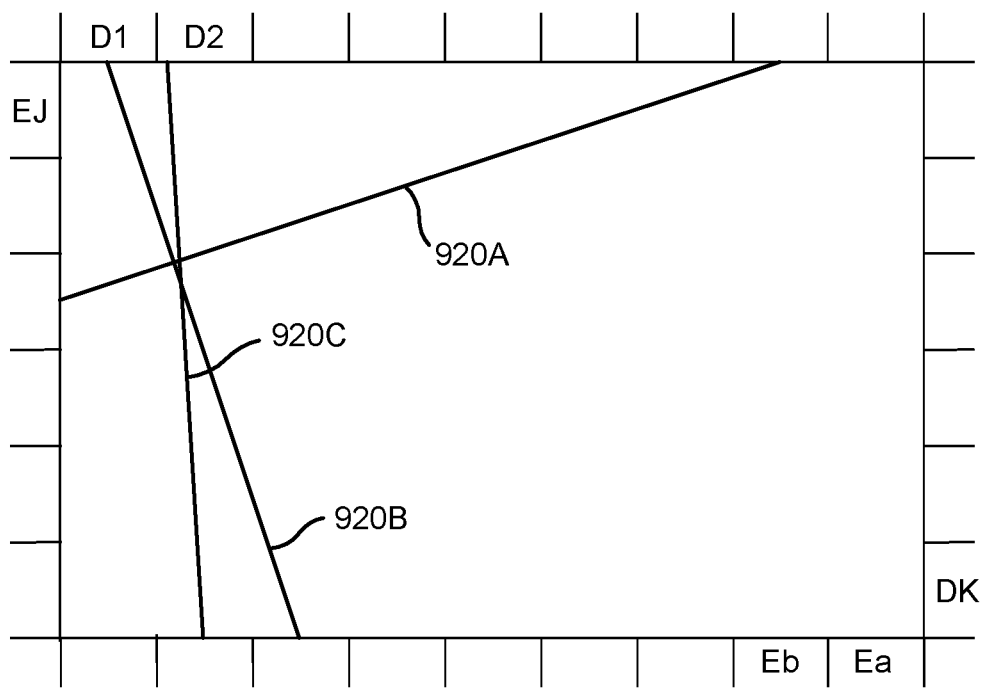
FIG. 9D is a top view illustrating estimation of the touch point, based on the interrupted beams of FIGS. 9A-9C and the line images of FIGS. 10A-10C, according to an embodiment.

The touch point 910 casts a "shadow" in each of the lines images 1021-1023. One approach is based on finding the edges of the shadow in the line image and using the pixel values within the shadow to estimate the center of the shadow. A line can then be drawn from a location representing the beam terminal to the center of the shadow. The touch point is assumed to lie along this line somewhere. That is, the line is a candidate line for positions of the touch point. FIG. 9D shows this. In FIG. 9D, line 920A is the candidate line corresponding to FIGS. 9A and 10A. That is, it is the line from the center of detector Dk to the center of the shadow in line image 1021. Similarly, line 920B is the candidate line corresponding to FIGS. 9B and 10B, and line 920C is the line corresponding to FIGS. 9C and 10C. The resulting candidate lines 920A-C have one end fixed at the location of the beam terminal, with the angle of the candidate line interpolated from the shadow in the line image. The center of the touch event can be estimated by combining the intersections of these candidate lines.

Each line image shown in FIG. 10 was produced using the beam pattern from a single beam terminal to all of the corresponding complimentary beam terminals (i.e., beam pattern from one detector to all corresponding emitters, or from one emitter to all corresponding detectors). As another variation, the line images could be produced by combining information from beam patterns of more than one beam terminal. FIG. 8E shows the beam pattern for emitter Ej. However, the corresponding line image will have gaps because the corresponding detectors do not provide continuous coverage. They are interleaved with emitters. However, the beam pattern for the adjacent detector Dj produces a line image that roughly fills in these gaps. Thus, the two partial line images from emitter Ej and detector Dj can be combined to produce a complete line image.

C. Location Interpolation

Applications typically will require a certain level of accuracy in locating touch points. One approach to increase accuracy is to increase the density of emitters, detectors and beam paths so that a small change in the location of the touch point will interrupt different beams.

Another approach is to interpolate between beams. In the line images of FIGS. 10A-C, the touch point interrupts several beams but the interruption has an analog response due to the beam width. Therefore, although the beam terminals may have a spacing of 4, the location of the touch point can be determined with greater accuracy by interpolating based on the analog values. This is also shown in curve 720 of FIG. 7. The measured Tjk can be used to interpolate the x position.

Figure 11A:
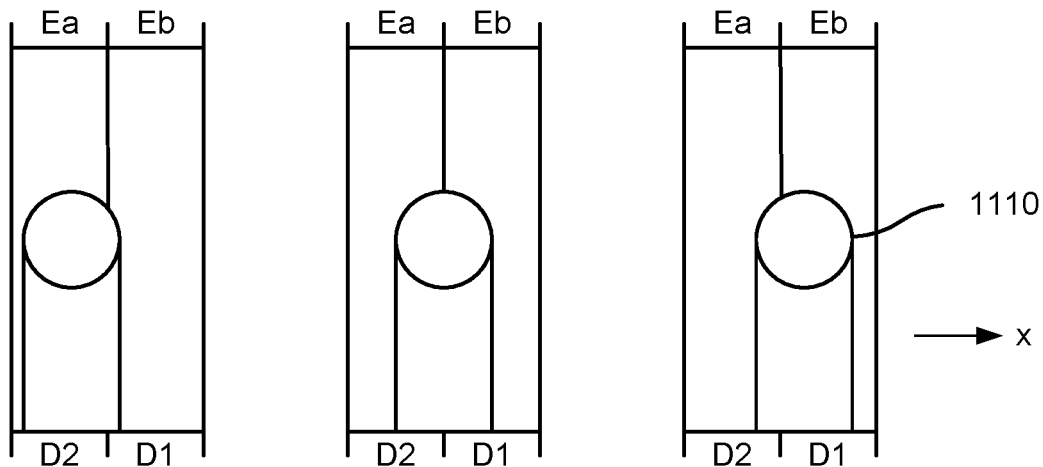
FIG. 11A is a top view illustrating a touch point travelling through two adjacent wide beams, according to an embodiment.
Figure 11B:
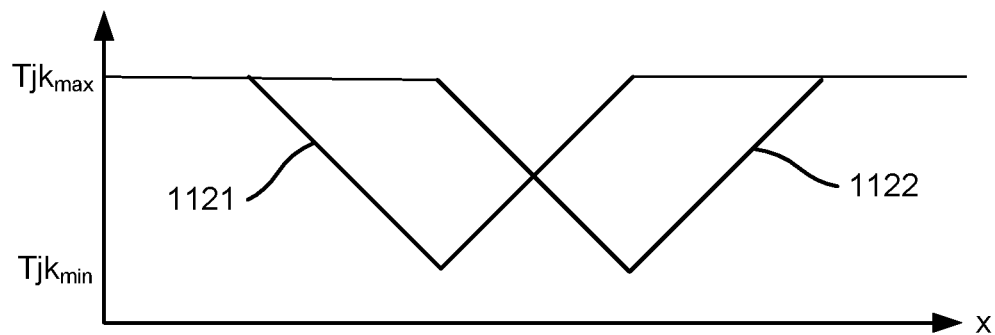
FIG. 11B are graphs of the analog responses for the two wide beams of FIG. 11A, according to some embodiments.

FIGS. 11A-B show one approach based on interpolation between adjacent beam paths. FIG. 11A shows two beam paths a2 and b1. Both of these beam paths are wide and they are adjacent to each other. In all three cases shown in FIG. 11A, the touch point 1110 interrupts both beams. However, in the lefthand scenario, the touch point is mostly interrupting beam a2. In the middle case, both beams are interrupted equally. In the righthand case, the touch point is mostly interrupting beam b 1.

FIG. 11B graphs these two transmission coefficients as a function of x. Curve 1121 is for coefficient Ta2 and curve 1122 is for coefficient Tb 1. By considering the two transmission coefficients Ta2 and Tb 1, the x location of the touch point can be interpolated. For example, the interpolation can be based on the difference or ratio of the two coefficients.

The interpolation accuracy can be enhanced by accounting for any uneven distribution of light across the beams a2 and b1. For example, if the beam cross section is Gaussian, this can be taken into account when making the interpolation. In another variation, if the wide emitters and detectors are themselves composed of several emitting or detecting units, these can be decomposed into the individual elements to determine more accurately the touch location. This may be done as a secondary pass, having first determined that there is touch activity in a given location with a first pass. A wide emitter can be approximated by driving several adjacent emitters simultaneously. A wide detector can be approximated by combining the outputs of several detectors to form a single signal.

Figure 11C:
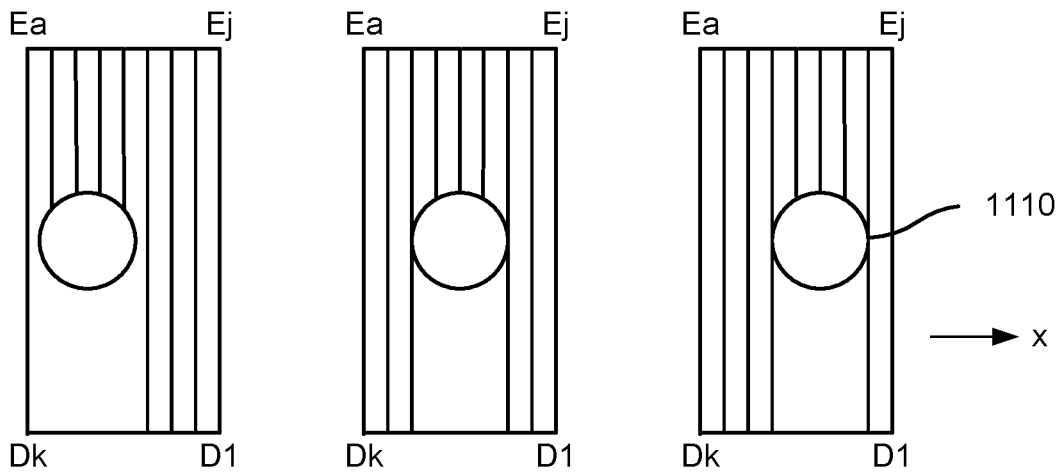
FIG. 11C is a top view illustrating a touch point travelling through many adjacent narrow beams, according to an embodiment.

FIG. 11C shows a situation where a large number of narrow beams is used rather than interpolating a fewer number of wide beams. In this example, each beam is a pencil beam represented by a line in FIG. 11C. As the touch point 1110 moves left to right, it interrupts different beams. Much of the resolution in determining the location of the touch point 1110 is achieved by the fine spacing of the beam terminals. The edge beams may be interpolated to provide an even finer location estimate.

D. Touch Event Templates

If the locations and shapes of the beam paths are known, which is typically the case for systems with fixed emitters, detectors, and optics, it is possible to predict in advance the transmission coefficients for a given touch event. Templates can be generated a priori for expected touch events. The determination of touch events then becomes a template matching problem.

If a brute force approach is used, then one template can be generated for each possible touch event. However, this can result in a large number of templates. For example, assume that one class of touch events is modeled as oval contact areas and assume that the beams are pencil beams that are either fully blocked or fully unblocked. This class of touch events can be parameterized as a function of five dimensions: length of major axis, length of minor axis, orientation of major axis, x location within the active area and y location within the active area. A brute force exhaustive set of templates covering this class of touch events must span these five dimensions. In addition, the template itself may have a large number of elements. Thus, it is desirable to simplify the set of templates.

Figure 12A:
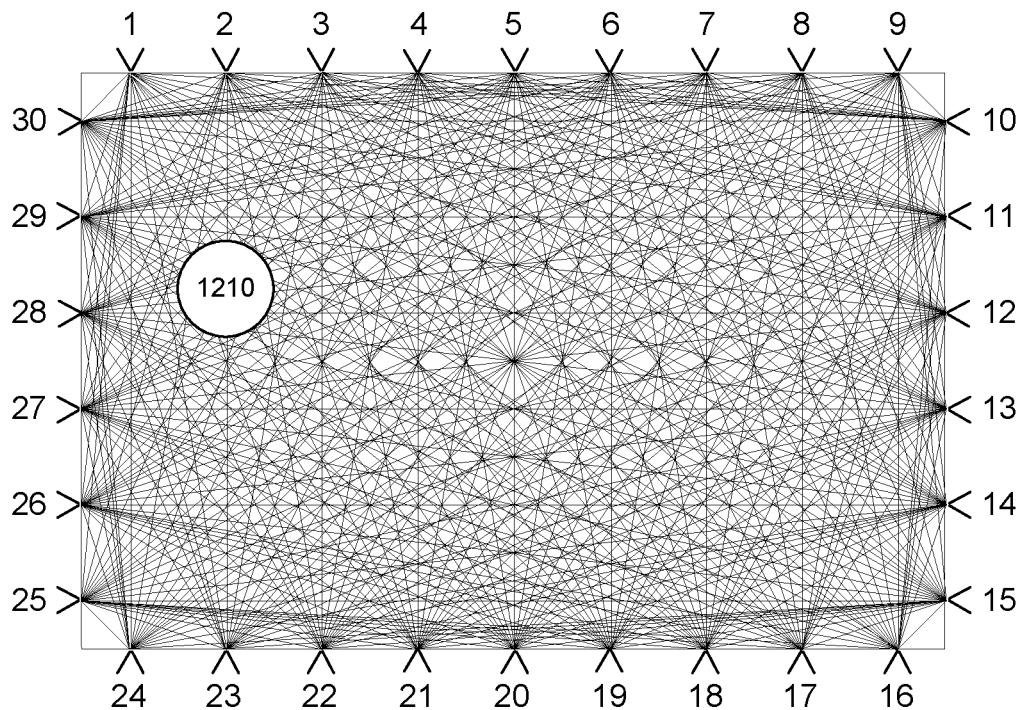
FIGS. 12A-12E are top views of beam paths illustrating templates for touch events, according to some embodiments.

FIG. 12A shows all of the possible pencil beam paths between any two of 30 beam terminals. In this example, beam terminals are not labeled as emitter or detector. Assume that there are sufficient emitters and detectors to realize any of the possible beam paths. One possible template for contact area 1210 is the set of all beam paths that would be affected by the touch. However, this is a large number of beam paths, so template matching will be more difficult. In addition, this template is very specific to contact area 1210. If the contact area changes slightly in size, shape or position, the template for contact area 1210 will no longer match exactly. Also, if additional touches are present elsewhere in the active area, the template will not match the detected data well. Thus, although using all possible beam paths can produce a fairly discriminating template, it can also be computationally intensive to implement.

Figure 12B:
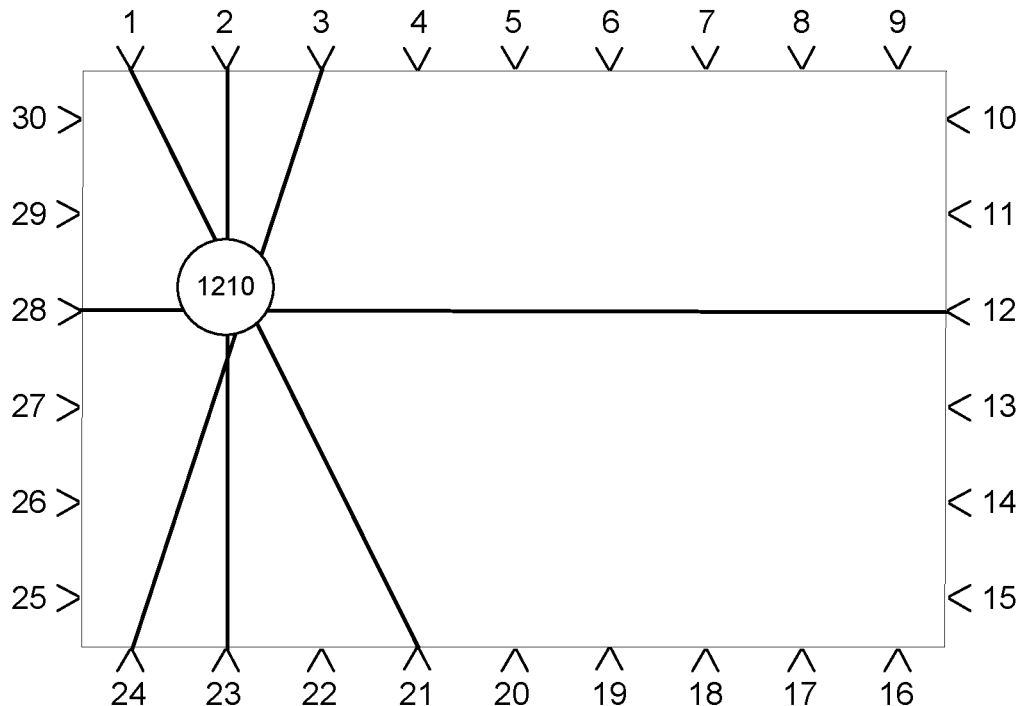

FIG. 12B shows a simpler template based on only four beams that would be interrupted by contact area 1210. This is a less specific template since other contact areas of slightly different shape, size or location will still match this template. This is good in the sense that fewer templates will be required to cover the space of possible contact areas. This template is less precise than the full template based on all interrupted beams. However, it is also faster to match due to the smaller size. These types of templates often are sparse relative to the full set of possible transmission coefficients.

Note that a series of templates could be defined for contact area 1210, increasing in the number of beams contained in the template: a 2-beam template, a 4-beam template, etc. In one embodiment, the beams that are interrupted by contact area 1210 are ordered sequentially from 1 to N. An n-beam template can then be constructed by selecting the first n beams in the order. Generally speaking, beams that are spatially or angularly diverse tend to yield better templates. That is, a template with three beam paths running at 60 degrees to each other and not intersecting at a common point tends to produce a more robust template than one based on three largely parallel beams which are in close proximity to each other. In addition, more beams tends to increase the effective signal-to-noise ratio of the template matching, particularly if the beams are from different emitters and detectors.

Figure 12C:
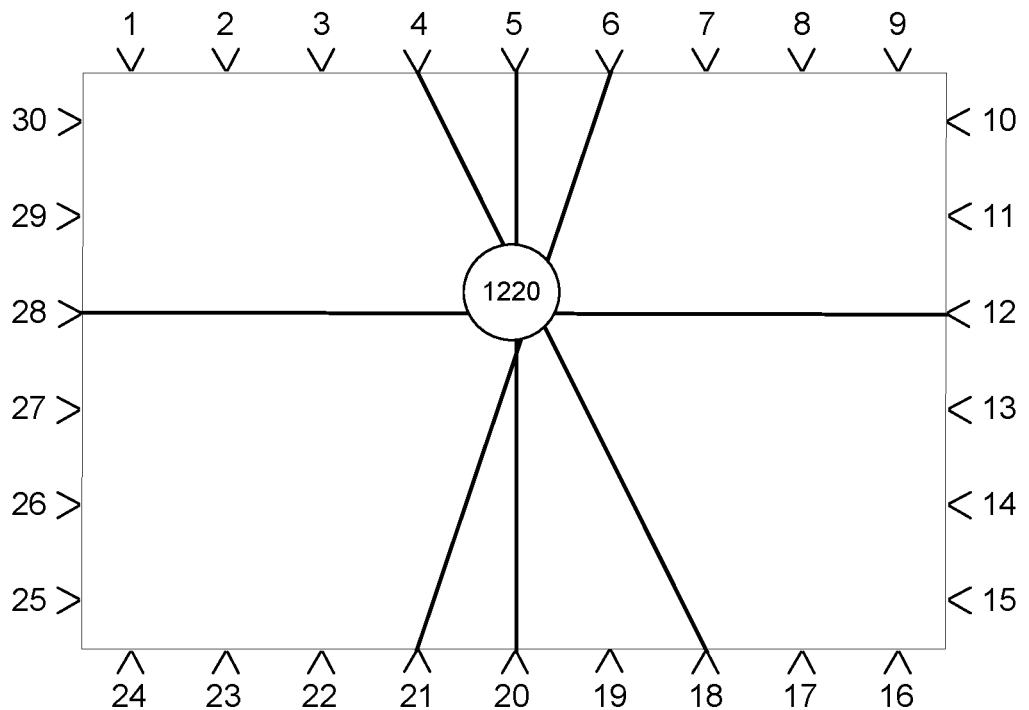

The template in FIG. 12B can also be used to generate a family of similar templates. In FIG. 12C, the contact area 1220 is the same as in FIG. 12B, but shifted to the right. The corresponding four-beam template can be generated by shifting beams (1,21) (2,23) and (3,24) in FIG. 12B to the right to beams (4,18) (5,20) and (6,21), as shown in FIG. 12C. These types of templates can be abstracted. The abstraction will be referred to as a template model. This particular model is defined by the beams (12,28) (i, 22−i) (i+1,24−i) (i+2,25−i) for i=1 to 6. In one approach, the model is used to generate the individual templates and the actual data is matched against each of the individual templates. In another approach, the data is matched against the template model. The matching process then includes determining whether there is a match against the template model and, if so, which value of i produces the match.

Figure 12D:
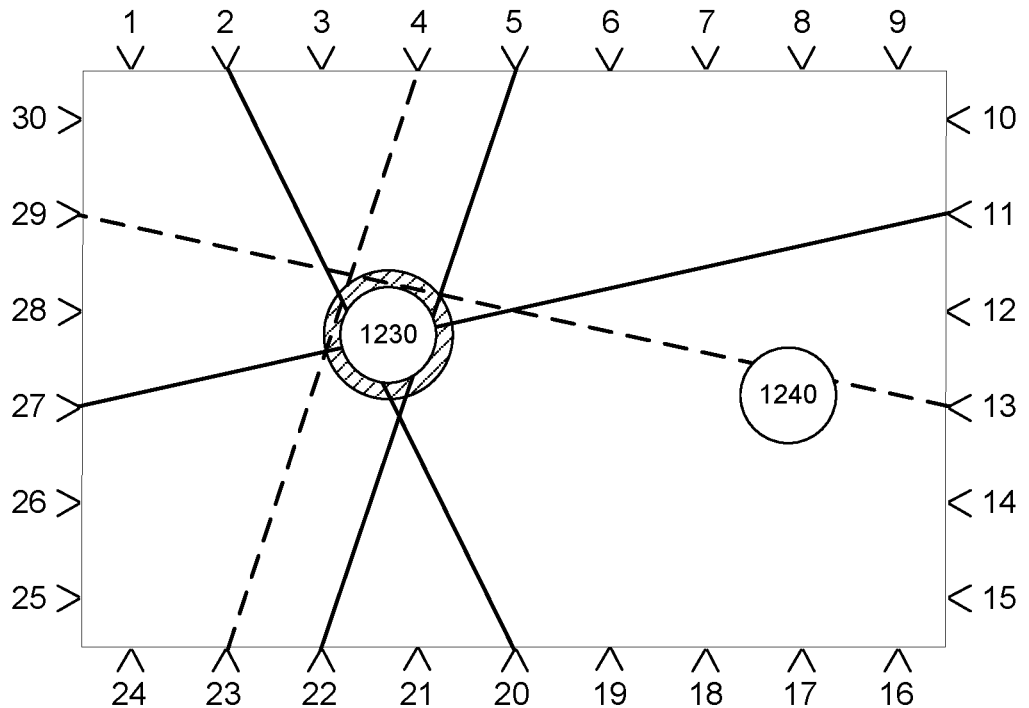

FIG. 12D shows a template that uses a "touch-free" zone around the contact area. The actual contact area is 1230. However, it is assumed that if contact is made in area 1230, then there will be no contact in the immediately surrounding shaded area. Thus, the template includes both (a) beams in the contact area 1230 that are interrupted, and (b) beams in the shaded area that are not interrupted. In FIG. 12D, the solid lines (2,20) (5,22) and (11,27) are interrupted beams in the template and the dashed lines (4,23) and (13,29) are uninterrupted beams in the template. Note that the uninterrupted beams in the template may be interrupted somewhere else by another touch point, so their use should take this into consideration. For example, dashed beam (13,29) could be interrupted by touch point 1240.

Figure 12E:
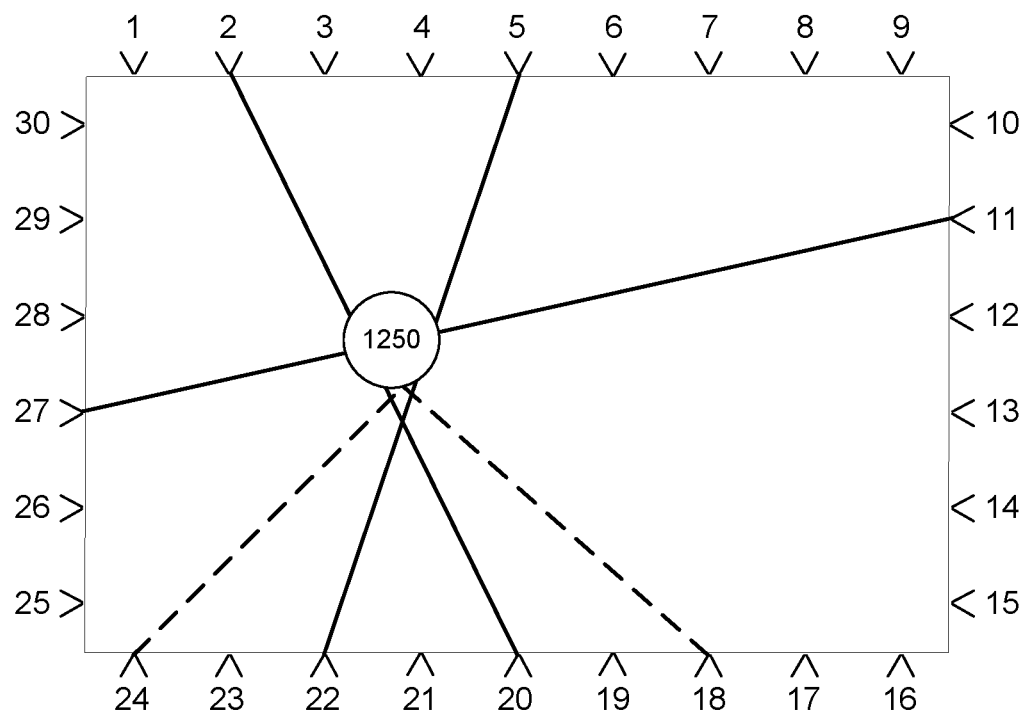

FIG. 12E shows an example template that is based both on reduced and enhanced transmission coefficients. The solid lines (2,20) (5,22) and (11,27) are interrupted beams in the template, meaning that their transmission coefficients should decrease. However, the dashed line (18,24) is a beam for which the transmission coefficient should increase due to reflection or scattering from the touch point 1250.

Other templates will be apparent and templates can be processed in a number of ways. In a straightforward approach, the disturbances for the beams in a template are simply summed or averaged. This can increase the overall SNR for such a measurement, because each beam adds additional signal while the noise from each beam is presumably independent. In another approach, the sum or other combination could be a weighted process, where not all beams in the template are given equal weight. For example, the beams which pass close to the center of the touch event being modeled could be weighted more heavily than those that are further away. Alternately, the angular diversity of beams in the template could also be expressed by weighting. Angular diverse beams are more heavily weighted than beams that are not as diverse.

In a case where there is a series of N beams, the analysis can begin with a relatively small number of beams. Additional beams can be added to the processing as needed until a certain confidence level (or SNR) is reached. The selection of which beams should be added next could proceed according to a predetermined schedule. Alternately, it could proceed depending on the processing results up to that time. For example, if beams with a certain orientation are giving low confidence results, more beams along that orientation may be added (at the expense of beams along other orientations) in order to increase the overall confidence.

The data records for templates can also include additional details about the template. This information may include, for example, location of the contact area, size and shape of the contact area and the type of touch event being modeled (e.g., fingertip, stylus, etc.).

In addition to intelligent design and selection of templates, symmetries can also be used to reduce the number of templates and/or computational load. Many applications use a rectangular active area with emitters and detectors placed symmetrically with respect to x and y axes. In that case, quadrant symmetry can be used to achieve a factor of four reduction. Templates created for one quadrant can be extended to the other three quadrants by taking advantage of the symmetry. Alternately, data for possible touch points in the other three quadrants can be transformed and then matched against templates from a single quadrant. If the active area is square, then there may be eight-fold symmetry.

Other types of redundancies, such as shift-invariance, can also reduce the number of templates and/or computational load. The template model of FIGS. 12B-C is one example.

In addition, the order of processing templates can also be used to reduce the computational load. There can be substantial similarities between the templates for touches which are nearby. They may have many beams in common, for example. This can be taken advantage of by advancing through the templates in an order that allows one to take advantage of the processing of the previous templates.

E. Multi-Pass Processing

Referring to FIG. 2, the processing phase need not be a single-pass process nor is it limited to a single technique.

Multiple processing techniques may be combined or otherwise used together to determine the locations of touch events.

Figure 13:
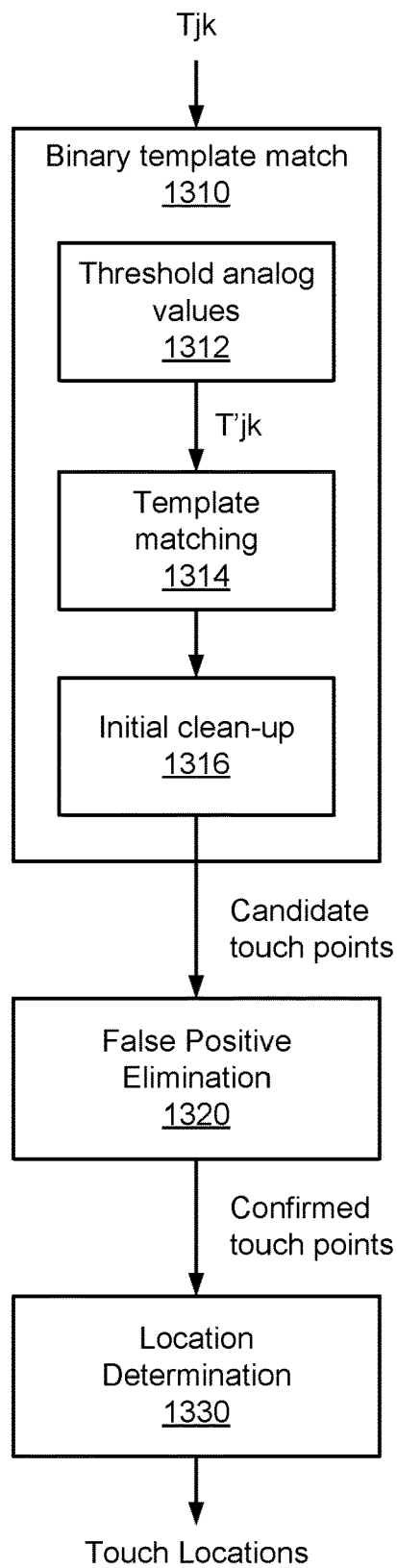
FIG. 13 is a flow diagram of a multi-pass method for determining touch locations, according to some embodiments.

FIG. 13 is a flow diagram of a multi-pass processing phase based on several stages. This example uses the physical set-up shown in FIG. 9, where wide beams are transmitted from emitters to detectors. The transmission coefficients Tjk are analog values, ranging from 0 (fully blocked) to 1 (fully unblocked).

The first stage 1310 is a coarse pass that relies on a fast binary template matching, as described with respect to FIGS. 12B-D. In this stage, the templates are binary and the transmittances T'jk are also assumed to be binary. The binary transmittances T'jk can be generated from the analog values Tjk by rounding or thresholding 1312 the analog values. The binary values T'jk are matched 1314 against binary templates to produce a preliminary list of candidate touch points. Thresholding transmittance values may be problematic if some types of touches do not generate any beams over the threshold value. An alternative is to threshold the combination (by summation for example) of individual transmittance values.

Some simple clean-up 1316 is performed to refine this list. For example, it may be simple to eliminate redundant candidate touch points or to combine candidate touch points that are close or similar to each other. For example, the binary transmittances T'jk might match the template for a 5 mm diameter touch at location (x,y), a 7 mm diameter touch at (x,y) and a 9 mm diameter touch at (x,y). These may be consolidated into a single candidate touch point at location (x,y).

Stage 1320 is used to eliminate false positives, using a more refined approach. For each candidate touch point, neighboring beams may be used to validate or eliminate the candidate as an actual touch point. The techniques described in U.S. Pat. No. 8,350,831 may be used for this purpose. This stage may also use the analog values Tjk, in addition to accounting for the actual width of the optical beams. The output of stage 1320 is a list of confirmed touch points.

The final stage 1330 refines the location of each touch point. For example, the interpolation techniques described previously can be used to determine the locations with better accuracy. Since the approximate location is already known, stage 1330 may work with a much smaller number of beams (i.e., those in the local vicinity) but might apply more intensive computations to that data. The end result is a determination of the touch locations.

Other techniques may also be used for multi-pass processing. For example, line images or touch event models may also be used. Alternatively, the same technique may be used more than once or in an iterative fashion. For example, low resolution templates may be used first to determine a set of candidate touch locations, and then higher resolution templates or touch event models may be used to more precisely determine the precise location and shape of the touch.

F. Beam Weighting

In processing the transmission coefficients, it is common to weight or to prioritize the transmission coefficients. Weighting effectively means that some beams are more important than others. Weightings may be determined during processing as needed, or they may be predetermined and retrieved from lookup tables or lists.

One factor for weighting beams is angular diversity. Usually, angularly diverse beams are given a higher weight than beams with comparatively less angular diversity. Given one beam, a second beam with small angular diversity (i.e., roughly parallel to the first beam) may be weighted lower because it provides relatively little additional information about the location of the touch event beyond what the first beam provides. Conversely, a second beam which has a high angular diversity relative to the first beam may be given a higher weight in determining where along the first beam the touch point occurs.

Another factor for weighting beams is position difference between the emitters and/or detectors of the beams (i.e., spatial diversity). Usually, greater spatial diversity is given a higher weight since it represents "more" information compared to what is already available.

Another possible factor for weighting beams is the density of beams. If there are many beams traversing a region of the active area, then each beam is just one of many and any individual beam is less important and may be weighted less. Conversely, if there are few beams traversing a region of the active area, then each of those beams is more significant in the information that it carries and may be weighted more.

In another aspect, the nominal beam transmittance (i.e., the transmittance in the absence of a touch event) could be used to weight beams. Beams with higher nominal transmittance can be considered to be more "trustworthy" than those which have lower norminal transmittance since those are more vulnerable to noise. A signal-to-noise ratio, if available, can be used in a similar fashion to weight beams. Beams with higher signal-to-noise ratio may be considered to be more "trustworthy" and given higher weight.

The weightings, however determined, can be used in the calculation of a figure of merit (confidence) of a given template associated with a possible touch location. Beam transmittance/signal-to-noise ratio can also be used in the interpolation process, being gathered into a single measurement of confidence associated with the interpolated line derived from a given touch shadow in a line image. Those interpolated lines which are derived from a shadow composed of "trustworthy" beams can be given greater weight in the determination of the final touch point location than those which are derived from dubious beam data.

These weightings can be used in a number of different ways. In one approach, whether a candidate touch point is an actual touch event is determined based on combining the transmission coefficients for the beams (or a subset of the beams) that would be disturbed by the candidate touch point. The transmission coefficients can be combined in different ways: summing, averaging, taking median/percentile values or taking the root mean square, for example. The weightings can be included as part of this process: taking a weighted average rather than an unweighted average, for example. Combining multiple beams that overlap with a common contact area can result in a higher signal to noise ratio and/or a greater confidence decision. The combining can also be performed incrementally or iteratively, increasing the number of beams combined as necessary to achieve higher SNR, higher confidence decision and/or to otherwise reduce ambiguities in the determination of touch events.

IV. Styli with Contact Sensors

Instead of a user's finger, a user may interact with the touch surface 131 via a stylus. A common stylus design mimics an ink pen or pencil, but a stylus can have many different shapes. A stylus may be an active or a passive stylus. Passive styli interact with the optical beams transmitted between emitters and detectors but do not but do not include electronic components or a power source. Active styli include a power source and electronic components that interact with the touch device 100. Active styli may add energy and may contain their own emitter(s) and detector(s). For example, an active stylus may couple light into a waveguide when contact is made. Active styli may contain a communications channel, for example a wireless connection, in order to coordinate their operation with the rest of the touch device 100. One advantage of styli compared to fingers, is that the stylus, and specifically its tip, can be designed to achieve a specific touch interaction with the optical beams. Different styli can be designed to implement different touch interactions, and they can then be distinguished on that basis.

For convenience, in the remainder of this description, styli are described as disturbing beams. Disturbed beams are beams affected by a stylus that would otherwise not be affected if the stylus did not interact with the touch device 100. Depending on the construction of the stylus, disturbing may include blocking, absorbing, attenuating, amplifying, scattering, reflecting, refracting, diffracting, filtering, redirecting, etc.

In some cases, a touch device 100 may mistakenly determine that a touch event has occurred before a stylus has physically contacted the touch surface 131 (this is referred to as premature touch detection). Premature touch detection can occur for an OTS touch device configuration (e.g., see FIG. 3B) because beams may be disturbed if the stylus is near the touch surface 131 but not in contact with it. For a TIR touch device configuration (e.g., see FIG. 3A), premature touch detection may occur due to contamination on the surface coupling light from the stylus into the waveguide before contact is made. Premature touch detection may also occur for other touch-sensitive devices, such as devices that use capacitive sensing, resistive sensing, acoustic wave sensing, camera sensing, etc. Since an ink pen does not write on a surface until it is in contact with the surface, it is desirable to confirm a stylus is in contact with the touch surface 131 before a touch event is determined to provide an analogous user experience.

To avoid incorrect touch determinations, touch devices 100 may have high confidence thresholds to determine whether a touch event has occurred or is currently occurring. High confidence thresholds may result in a touch device 100 not recognizing touch events that disturb an insufficient number of beams. In other cases, due to a high confidence threshold, a touch device 100 may wait to receive a sufficient amount of beam data (e.g., Tjk coefficients) before concluding a touch event has occurred. This waiting may result in the touch device 100 being too slow to recognize touch events and cause user frustration.

This and other problems may be addressed by active styli with contact sensors that assist the touch device 100 in determining touch events. For example, a stylus may detect contact with the touch surface 131 via a contact sensor and subsequently emits an optical signal informing the touch device 100 that the stylus is in contact with the surface 131. In some embodiments, the signal is periodically emitted to confirm the stylus is still in contact with the surface 131. Another signal may be emitted after the stylus is removed from the surface 131. This assistance may reduce the time spent by the touch device 100 determining or confirming whether a touch event has occurred.

Styli with contact sensors are described herein as interacting with a touch surface 131 of an optical touch-sensitive device 100. However, it will be appreciated that the styli are not limited to use with optical touch-sensitive devices 100. For example, styli or components of the styli (e.g., contact sensors) may be incorporated into styli that interact with capacitive or resistive touch devices. Furthermore, as described herein, "surface" refers to any surface that a stylus can contact while "touch surface 131" refers to the touch surface of an optical touch-sensitive device 100.

Figure 14:
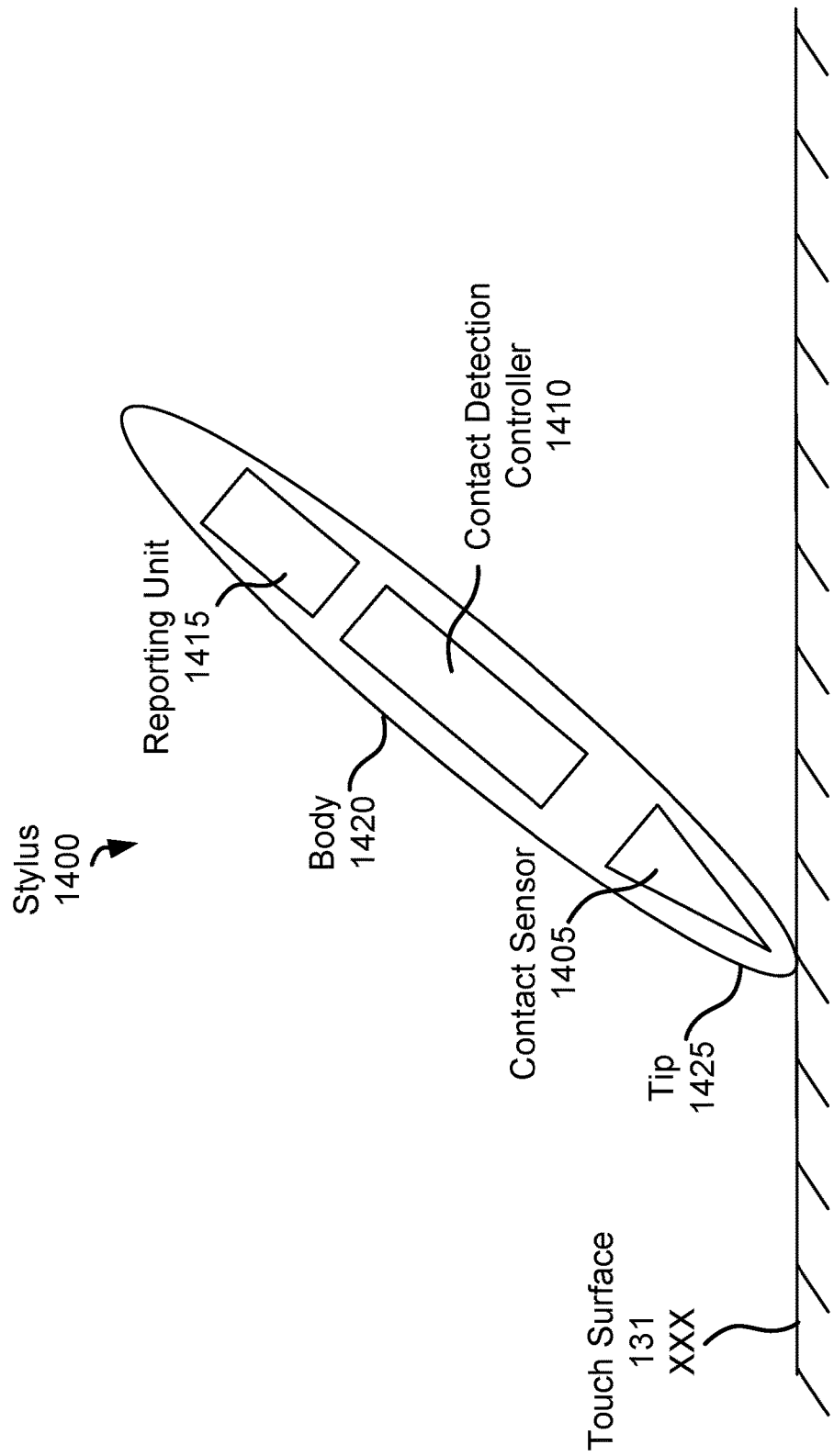
FIG. 14 is a cross-sectional view of an active stylus in contact with a touch surface, according to an embodiment.

FIG. 14 is a cross-sectional view of an active stylus 1400 in contact with a touch surface 131, according to an embodiment. The stylus 1400 includes components, such as a contact sensor 1405, a reporting unit 1415, and a contact detection controller 1410.

The contact sensor 1405 detects touch events between the stylus 1400 and a surface (e.g., the touch surface 131) by measuring one or more properties. Examples of the contact sensors 1405 include audio sensors, video sensors, accelerometers, gyroscopes, force sensors, transducers, pressure sensors, strain gauges, and capacitive displacement sensors. Contact sensors 1405 are further described below in Sections IV.A.-IV.D.

In some embodiments, a stylus 1400 with a contact sensor 1405 includes a tip 1425 that is moveable relative to the stylus body 1420. Since a pen tip (e.g., of a ball point pen) only retreats into the pen body by a small amount, it is desirable for the range of displacement of the tip 1425 to also be small (e.g., between 100 nanometers and 250 micrometers) since larger movements (e.g., on the order of a millimeter or more) can result in unrealistic and unrewarding writing experiences compared to a pen. Due to these small displacement distances, contact sensors 1405 with electrical switches may be unreliable. Thus, it may be undesirable for the contact sensors 1405 to operate via electrical contact switches.

The contact detection controller 1410 receives measurements from the contact sensor 1405 and determines if a touch event has occurred. This touch event determination is then communicated to one or more components of the touch device 100 (e.g., the touch event processor 140). Generally, the contact detection controller 1410 determines whether the stylus 1400 is in contact with a surface. In some embodiments (as further described below), the contact detection controller 1410 determines whether the stylus 1400 is in contact with the touch surface 131. The contact detection controller 1410 may be communicatively coupled to the touch device 100 via the reporting unit 1415. To save battery, the contact detection controller 1410 may not continuously process measurements from the transducer 1500. For example, measurement processing may be triggered by a rapid change in measurement values from the contact sensor 1405.

The reporting unit 1415 is communicatively coupled to the contact detection controller and the touch device 100. The reporting unit 1415 transmits an indication of whether the stylus contacted and/or is in contact with the surface. The indication may be a determination from the contact detection controller 1410 or it may be measurements from the contact sensor 1405). The reporting unit 1415 may transmit signals to the touch device 100 via wireless methods such as WIFI, Bluetooth®, etc. In some embodiments, signals are transmitted to a detector of the touch surface 131. This may be performed by coupling a signal through the tip of the stylus and into the waveguide or over the surface 131 to the detector (e.g., see FIG. 16B). In some embodiments, the contact detection controller 1410 is a component of the touch-sensitive device 100. For example, the contact detection controller 1410 is integrated into the controller 110 or the touch event processor 140. This may be in addition to or alternative to the stylus 1400 containing a contact detection controller 1410. In these embodiments, the reporting unit 1415 may transmit contact sensor 1405 measurements to the contact detection controller 1410 in the touch device 100.

As previously indicated, determinations from the contact detection controller 1410 may assist the touch device 100 determine touch events and increase the functionality of the touch device 100. For example, a determination by the contact detection controller 1410 increases a confidence of a touch event determination independent performed by the touch device 100. In another example, by comparing touch event times, a touch event determined by the contact detection controller 1410 may be associated with a touch event independently determined by the touch device 100 (e.g., by analyzing Tjk values). Associating a stylus 1400 with a touch event may be beneficial if multiple touch events occurred on the touch surface 131.

A. Transducers

When a stylus 1400 contacts a surface, the contact force may result in a transient wave propagating through the stylus body. Due to this, contact with a surface may be determined by measuring the propagating transient wave. The transient wave may be measured by a contact sensor 1405 that includes a transducer. Example styli 1400 with transducers 1500 are illustrated in FIGS. 15A-D and are further described below.

FIGS. 15A and 15B are views of a transducer 1500 connected to a stylus 1400 via two attachment points 1505, according to some embodiments. FIGS. 15C and 15D are views of a transducer 1500 connected to a stylus 1400 via a single attachment point 1505, according to some embodiments. FIGS. 15A and 15C are front views of the transducer 1500 and FIGS. 15B and 15D are side views of the transducer 1500.

The transducer 1500 is a device that converts energy from one form to another. Examples of transducers 1500 include piezoelectric transducers, electrostatic transducers, or electromagnetic transducers (e.g., it includes a movable coil or magnet). In this case, the transducer 1500 converts energy from a transient wave 1510 propagating through the stylus body 1420 into an electrical signal. In some cases, the transducer 1500 is an audio sensor (also referred to as a microphone). In these cases, the audio sensor may measure transient audio waves propagating through air. The transducer 1500 is generally located on the inner surface of the body to avoid being damaged during use of the stylus 1400. Since the transient wave 1510 propagates through the stylus body 1420, it may be coupled to any portion of the stylus body 1420 that will receive the transient wave 1510 (e.g., it does not need to be in the tip of the stylus 1400).

For a given contact force, the propagation properties of a transient wave 1510 are generally consistent for touch events on a surface. Additionally, increased contact force typically results in increased transient wave amplitude while other properties of the wave 1510 are typically unchanged. The propagation properties of the transient wave 1510 may depend on the mechanical properties of the contacting surface and the stylus body 1420. The mechanical properties may depend on the materials (e.g., metal or plastic) and the shape of the surface and stylus 1400. The magnitude and direction of the contact force on the stylus may also affect the propagation properties.

Since the materials of the touch surface 131 are generally known and uniformly distributed across the surface, the waves 1510 generated by a touch events on the touch surface 131 may be predictable or well known. For example, if the touch surface 131 and the stylus 1400 have hard surfaces, the transient waves may be characterized by amplitudes that rapidly rise and fall over time. Thus, a contact detection controller 1410 may be configured to recognize the specific transient waves 1510 generated by the tip of the stylus 1400 contacting the touch surface 131 (referred to as wanted waves). Similarly, unwanted waves may be filtered out. Examples of unwanted waves include those caused by other parts of the stylus contacting the touch surface 131 (e.g., the tip 1425 is made of a harder material than the body 1420) or caused by the stylus 1400 contacting surfaces other than the touch surface 131 (e.g., skin or a table).

Transducer measurements of wanted waves may be distinguished from measurements of unwanted waves by spectral filtering. For example, since wanted waves typically have high frequencies compared to unwanted waves, the contact detection controller 1410 may include a high-pass filter to filter out measurements from unwanted waves. In some cases, unwanted wave measurements are distinguished from wanted wave measurements by examining the frequency components of the measurements via Fourier analysis.

Additionally or alternatively, wanted and unwanted waves may be distinguished via temporal filtering. For example, measurements from the transducer are correlated with a reference wave. The reference wave may be a waveform of a typical wanted wave. If the correlation is higher than a threshold value, the measured wave may be categorized as a wanted wave.

In some embodiments, the magnitude of the contact force is determined. For example, contact forces above a threshold value may be categorized as a touch events while contact forces below the threshold value may not be categorized as touch events. Since the amplitude of a transient wave 1510 may be indicative of the magnitude of a contact force, the magnitude of the contact force may be determined by calculated the peak value, absolute mean value, or root mean square value of a set of measurements from the transducer 1500.

In addition to detecting contact with a surface, the transducer 1500 may be used to detect movement of the stylus over the touch surface 131. Specifically, friction between the tip and the surface may result in vibrations that may be measured by the transducer 1500 and identified by the contact detection controller 1410. In another example, the touch surface 131 includes a texture that produces identifiable stylus vibrations. The touch surface 131 may include a texture to improve optical and tactile performance of the touch surface 131.

In some embodiments, the transducer 1500 and contact detection controller 1410 can determine if the stylus 1400 is raised from the surface (referred to as liftoff). For example, the transducer 1500 measures a wave 1510 produced from the acceleration experienced by the stylus 1400 during liftoff. Liftoff may also result in another an identifiable transient wave 1510 propagating through the stylus body 1420.

If the transducer 1500 is connected to the body 1420 via two attachment points 1505 (e.g., see FIGS. 15A and 15B), the transducer 1500 measures physical displacements of one attachment point 1505 relative to the other. Thus, the transducer 1500 may accurately measure a transient wave 1510 travelling up the length of the stylus (e.g., due to the tip hitting a surface) because the transducer will detect the transient wave 1510 impacting one attachment point 1505 and then the other. If the transducer 1500 is connected to the body 1420 via a single attachment point, the other end of the transducer 1500 may be connected to a reference mass 1515 (e.g., see FIGS. 15C and 15D). In such embodiments, the transducer 1500 may be less sensitive to transient waves 1510 but more sensitive to general accelerations experienced by the entire stylus 1400 (compared to the transducer 1500 connected to the body via two attachment points 1505). Determining information about the general acceleration of the stylus 1400 may be advantageous if the touch device 100 is a hand-held device. For example, the touch device 100 may determine touch events from the stylus 1400 differently if the stylus is experiencing high levels of general acceleration (e.g., the user is using the stylus while on an airplane).

B. Displacement Sensors

To detect touch events between the stylus 1400 and a surface, the contact sensor 1405 may include a displacement sensor. Displacement sensors measure a change in position of a stylus component or a nearby object, such as a hand or surface. Displacement sensors may include proximity sensors. A displacement sensor may measure the change in position through capacitive, inductive, or optical techniques. In the examples described below, contact detection is performed by mechanically coupling a moveable component of the stylus 1400, such as the tip, to a displacement sensor.

Figure 16A:
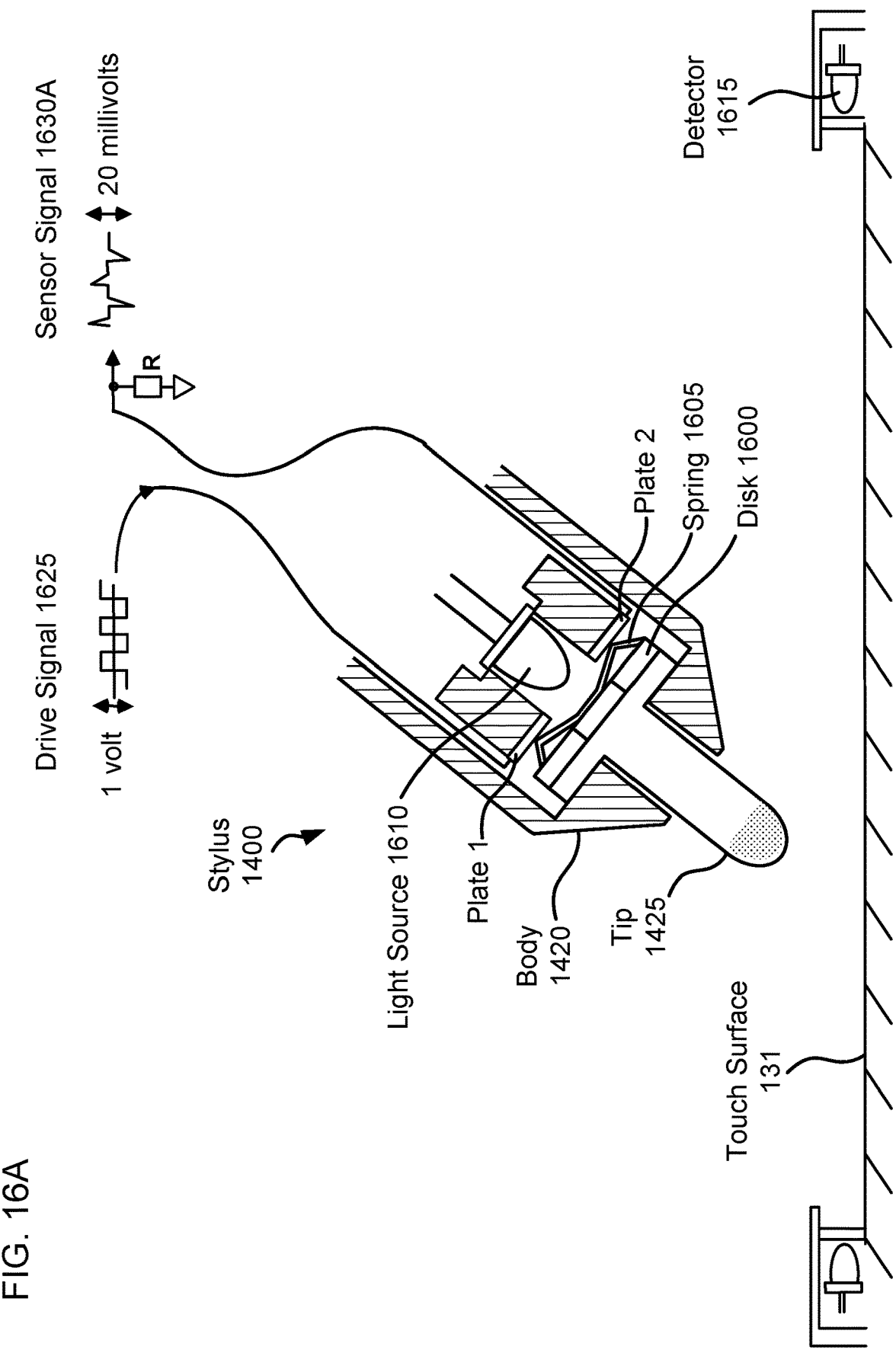
FIGS. 16A and 16B are views of a capacitive displacement sensor in a stylus, according to some embodiments.
Figure 16B:
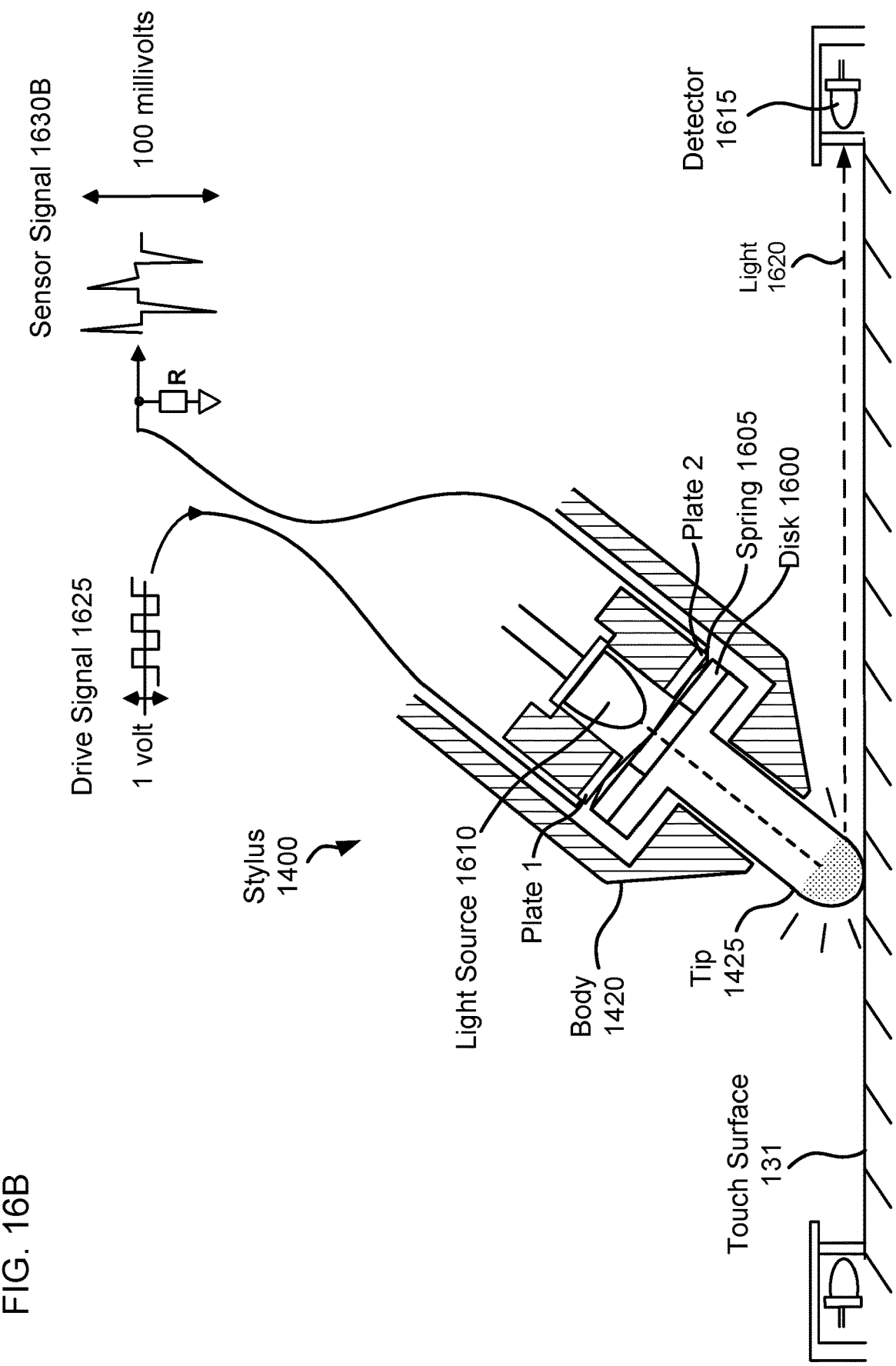

FIGS. 16A and 16B are views of a capacitive displacement sensor in a stylus 1400, according to some embodiments. The stylus 1400 includes a tip 1425 that is retractable into the stylus body 1420. The capacitive displacement sensor includes stationary conductive plates (plate 1 and plate 2) that are adjacent to each other within the body 1420. The plates may be metal (e.g., copper) plates formed on a printed circuit board. The capacitive displacement sensor also includes a conductive disk 1600 that is parallel to the plates and coupled to the tip 1425. A transparent (e.g., polymer) spring 1605 applies a force to separate the disk 1600 from the plates. When the stylus 1400 contacts a surface, the tip 1425 retracts into the body 1420 and, as a result, the distance between the disk 1600 and the plates decreases. As the distance decreases, the capacitive coupling between the disk 1600 and the plates increases.

By measuring a property indicative of the capacitive coupling (e.g., the voltages or current in plate 1 and plate 2), the contact detection controller 1410 (not illustrated) determines if the stylus 1400 is in contact with a surface. Detecting the capacitive coupling may be performed by applying a periodic or non-periodic drive signal to plate 1 and measuring a sensor signal in plate 2. For example, a 1 megahertz square-wave or sawtooth waveform has sharp rising and falling edges that couple effectively through the capacitive elements even if the impedance of the detection electronics is low (e.g., tens of kiloohms). An example drive signal 1625 (e.g., provided by a power source not shown in the FIGS.) and sensor signals 1630A and 1630B are illustrated in FIGS. 16A-B. Displacements on the order of tens of micrometers may be readily detected by this configuration, however displacements of this order may not be noticed by the user. In some embodiments, no wires are coupled to the tip 1425 (or any other moving components) because the wires may be vulnerable to failure over time due to repeated movement.

The reporting unit 1415 of the stylus 1400 illustrated in FIGS. 16A and 16B includes a light source 1610. The light source 1610 may emit light 1620 (e.g., infrared light) that passes through a hole in the disk 1600 and is coupled into the tip 1425. The light 1620 may propagate out of the tip 1425 such that, when the tip 1425 is in contact with the touch surface 131, the light 1620 is received by a detector 1615 of the touch-sensitive device 100. This may allow the touch device 100 to determine the stylus 1400 is in contact with the touch surface 131. The light source 1610 may continually emit light or may only emit light when the tip 1425 is in contact with a surface. In some embodiments, the light 1620 includes encoded information (e.g., touch event determinations from the contact detection controller or contact sensor measurements from the contact sensor).

Additionally or alternatively, the contact sensor 1405 may include an inductive displacement sensor. An inductive displacement sensor may include a primary coil and a secondary coil that is inductively coupled to the primary coil. The coils are coupled to (e.g., contained within) the body 1420. A driving signal (e.g., similar to signal 1623) may be applied to the primary coil and a sensing signal may be measured from the secondary coil. The sensing signal may be indicative of the inductive coupling between the coils. The tip 1425 includes an inductive element that affects the inductive coupling between the coils. For example, the inductive element is a magnet or a material with a high magnetic permeability, such as iron. Thus, movements of the tip 1425 may change the inductive coupling between the coils. Thus, tip 1425 movements may be determined from the sensing signal. In some embodiments, the primary and secondary coils are combined into a single coil (e.g., similar to the coil of an autotransformer). In some embodiments, the coils are coupled to the moveable tip 1425 and the magnet or a material with a high magnetic permeability is coupled to the body 1420.

Figure 17:
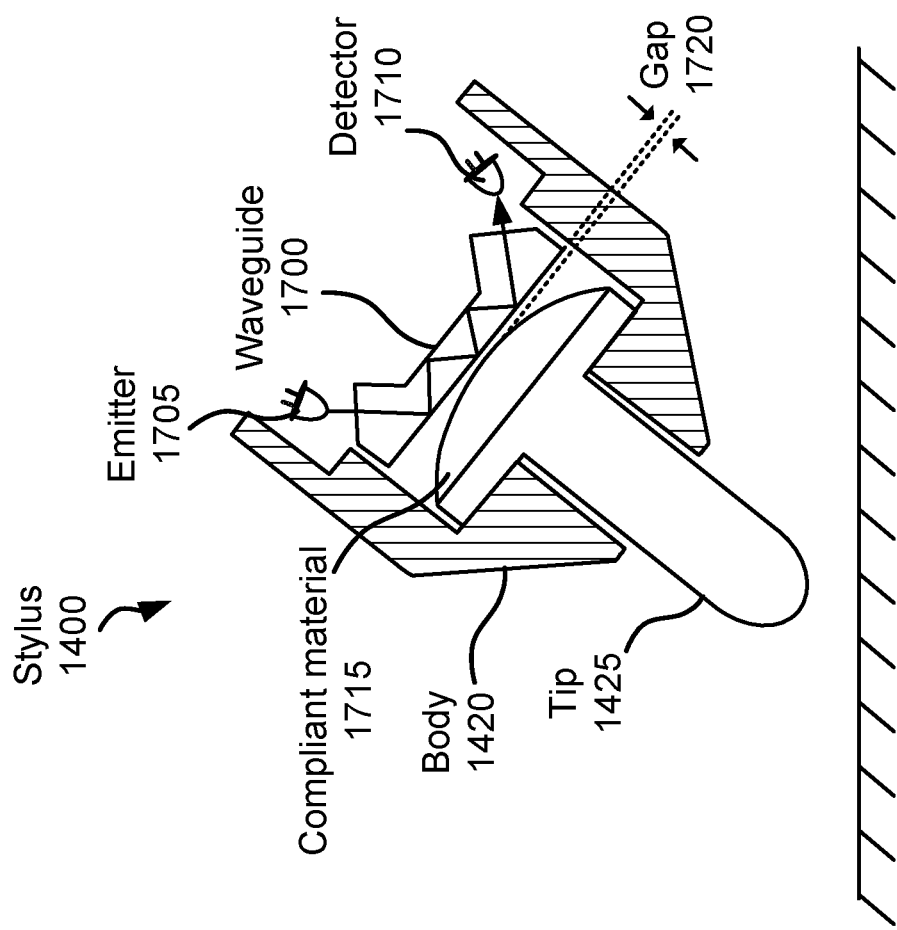
FIG. 17 is a view of an optical displacement sensor in a stylus, according to an embodiment.

Additionally or alternatively, the contact sensor 1405 may include an optical displacement sensor. FIG. 17 is a view of an optical displacement sensor in a stylus 1400, according to an embodiment. The optical displacement sensor includes a stationary waveguide 1700, emitter 1705, and detector 1710 coupled to the body. Similar to a TIR touch device configuration (e.g., see FIG. 3A), the emitter 1705 emits optical beams that propagate through the waveguide 1700 via TIR and are received by the detector 1710. The optical displacement sensor also includes a tip 1425 that can become optically coupled to the waveguide 1700 by retracting into the stylus body 1420. In some embodiments, the waveguide 1700, emitter 1705, and detector 1710 are coupled to the tip 1425 and the body 1420 includes a component that may become optically coupled to the waveguide 1700.

If the stylus 1400 is not contacting the surface, the tip 1425 and waveguide 1700 are separated by a gap 1720 (e.g., an air gap). For example, a spring (not illustrated) separates the tip 1425 from the waveguide 1700. The gap 1720 may be large enough (e.g., a few micrometers wide) such that the tip 1425 is not optically coupled to the waveguide (e.g., little or no light is coupled into or out of the waveguide 1700 due to the tip 1425). Gas in the gap 1720 may form a low refractive index boundary with the surface of the waveguide 1700. For example, the gap is filled with air and the waveguide 1700 is composed of glass or a polymer such as PMMA (poly(methyl methacrylate)) or polycarbonate.

If the stylus 1400 contacts a surface, the tip 1425 may retract into the body 1420 and, as a result, the tip 1425 contacts the waveguide 1700 or is brought close to the waveguide 1700 (e.g., within 500 nanometers). When this occurs, the tip 1425 and the waveguide 1700 may become optically coupled such that the amount of light in the waveguide changes. By measuring a change in the amount of light in the waveguide 1700 (via the detector 1710), the contact detection controller 1410 (not shown) may determine that the tip 1425 is in contact with a surface. Typically, the change in the amount of light is proportional to the strength of the optical coupling between the tip 1425 and the waveguide 1700.

The tip 1425 and waveguide 1700 may become optically coupled even if they are not in contact (referred to as evanescent coupling). This is due to an evanescent field of the light in the waveguide extending beyond the boundary of the waveguide. The evanescent field results in optical coupling between the tip 1425 and the waveguide 1700 that rises (e.g., exponentially) for distances less than about half a wavelength. Thus, if the emitter 1705 emits light with visible or near-infrared wavelengths (e.g., in the range of 400 to 950 nanometers), tip displacements that are substantially sub-micrometer in extent may be detected reliably.

In some embodiments, light from an emitter of the touch surface 131 is coupled into the waveguide 1700 via the tip 1425 (e.g., the tip is transparent). Additionally or alternatively, the tip 1425 may include a light source. Thus, contact with the touch surface 131 may result in an increased amount of light in the waveguide 1700. In other embodiments, the tip 1425 disturbs beams in the waveguide 1700. Thus, contact with the touch surface 131 may result in a decreased amount of light in the waveguide 1700.

In some embodiments, the tip 1425 and waveguide 1700 elements are not separated by a gap 1720. Instead, the tip 1425 and waveguide 1700 may be separated by the non-planar imperfections of one or both surfaces. In the absence of a contact force pushing the surfaces together, the optical coupling between tip 1425 and waveguide 1700 is typically poor. In the presence of a contact force, portions of the surfaces are brought closer together. This results in stronger optical coupling and may result in large changes in the amount of light in the waveguide 1700.

In some embodiments, the tip 1425 or waveguide 1700 includes a compliant material 1715. Optical coupling between the compliant material 1715 and the waveguide 1700 may be small (or nonexistent) in the absence of a contact force. However, the amount of optical coupling may detectably increase for even small contact forces. In these embodiments, optical coupling between the tip 1425 and waveguide 1700 increases with increases in contact force. Thus, force measurements may be determined in addition to a touch event determinations. Note that the displacement of the compliant material 1715 may be in the range of tens of micrometers, so the construction may still feel rigid to the user.

In some embodiments, optical displacement sensors include grids, gratings, or meshes that move relative to one another. For example, one grid is coupled to the movable tip 1425 while another is coupled to the body 1420. The grids are placed between the emitter 1705 and detector 1710 (e.g., the waveguide 1700 is not present) such that the transmission of light through the grids is modulated by physical movements of the tip 1425. The amount of modulation may be proportional to the displacement of the tip 1425 relative to the body 1420. In some cases, the grid coupled to the tip 1425 provides sufficient modulation (e.g., the grid coupled to the body 1420 is not needed).

C. Resonance Sensor

Figure 18:
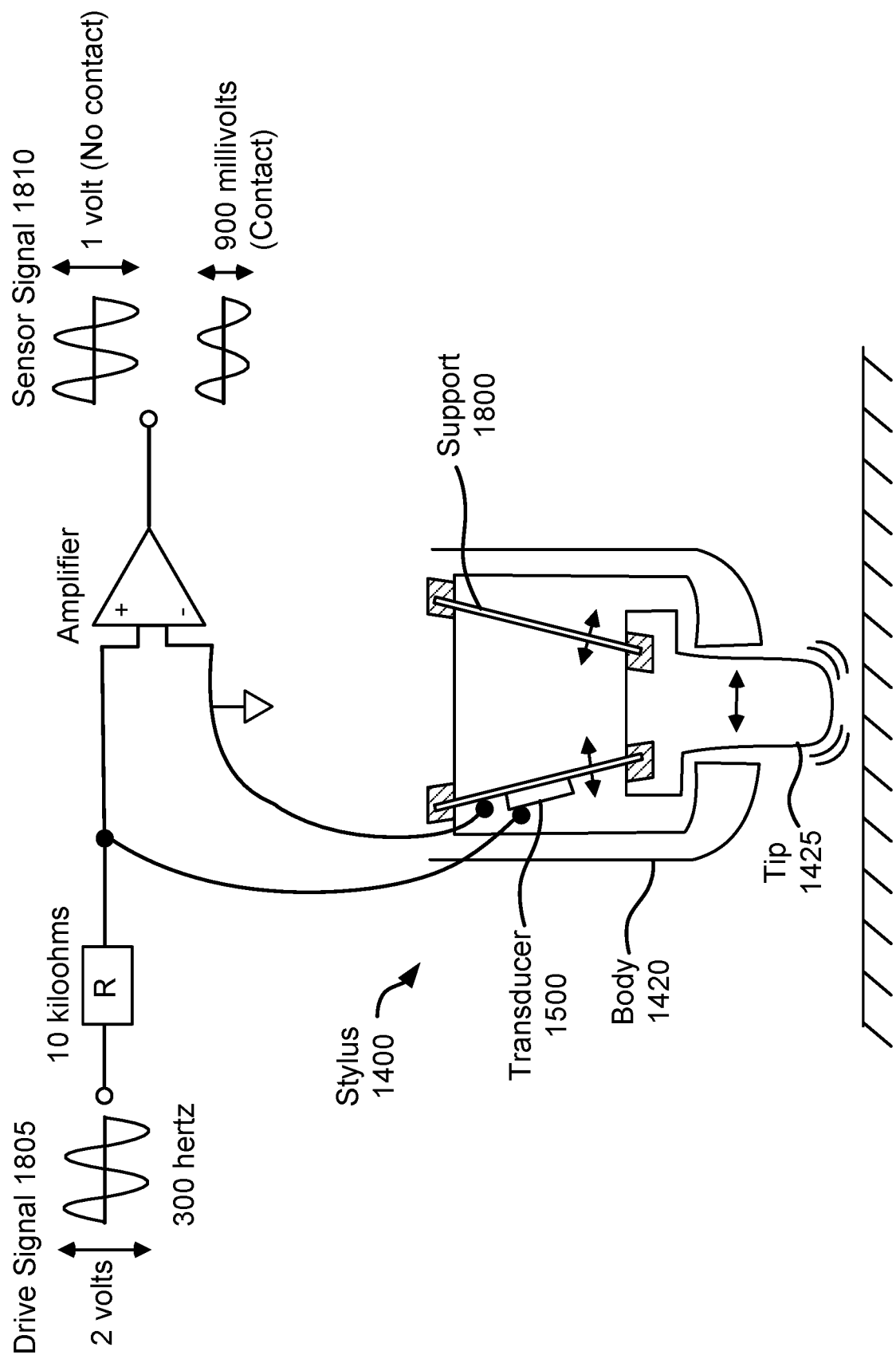
FIG. 18 is a view of a resonance sensor in a stylus, according to an embodiment.

To detect touch events between the stylus 1400 and a surface, the contact sensor 1405 may include a resonance sensor. FIG. 18 is a view of a resonance sensor in a stylus 1400, according to an embodiment. The resonance sensor includes a transducer 1500 that is coupled to a moveable tip 1425 and the body 1420. A flexible support 1800 may also be coupled to the tip 1425 and body 1420. The transducer 1500 and support 1800 may be coupled to the body 1420 and tip 1425 by a cured resin bond. By applying an alternating current (AC) driving signal to the transducer 1500, the transducer 1500 vibrates the tip 1425 (e.g., laterally from side to side). Contact with a surface may change the vibrational properties of the tip (e.g., amplitude and frequency) due to the surface opposing the vibrations. For example, the amplitude of the vibrations is reduced. Styli with resonance sensor may have the advantage of being perceived by the user as rigid, while also being sensitive to gentle contacts with a surface.

FIG. 18 also includes an example circuit diagram illustrated above the stylus 1400. The circuit includes an amplifier connected across the transducer 1500. A drive signal 1805 is applied to an input terminal of the amplifier and a sensor signal 1810 is measured at the amplifier output. Example signal and component values are also indicated.

Depending on the transducer 1500, a 5 volt AC driving signal 1805 may result in vibrational movement on the order of tens of micrometers. The transducer 1500 may have a frequency response in the range of 100 hertz to 20 kilohertz. With the mass of the coupled tip 1425, the resonant frequency of the transducer 1500 may be in the range of 100 hertz to 1 kilohertz. In some embodiments, the tip 1425 is driven at a frequency which is at or close to its resonant frequency. Driving the system into resonance may reduce (e.g., minimize) power consumption. Tip contact with a surface may be detected be measuring a sensing signal 1810 from the transducer 1500. The sensing signal 1810 may be measured from the same transducer 1500 if it is a reversible type transducer. Thus, the sensing signal may be a combination of the driving signal and variations in tip movement (e.g., due to contact with a surface). One way to do this is to apply the electrical driving signal to the transducer through a resistor R, for example, with a resistance of 10 kiloohms. The impedance of the transducer 1500 may be high enough that the amplitude of the drive signal is not significantly reduced by the driving series resistor. The sensing signal 1810 may also be measured from a separate sensing transducer. In some cases, tip contact is determined because the amplitude of the sensing signal 1810 decreases when the tip 1425 is in contact with a surface. Contact may also be detected by measuring a change in resonant frequency. For example, a driver is configured to adjust the frequency of the AC drive signal 1805 until the amplitude of the sensing signal reaches a maximum (this may indicate the system is in resonance).

D. Permittivity Sensors

Figure 19:
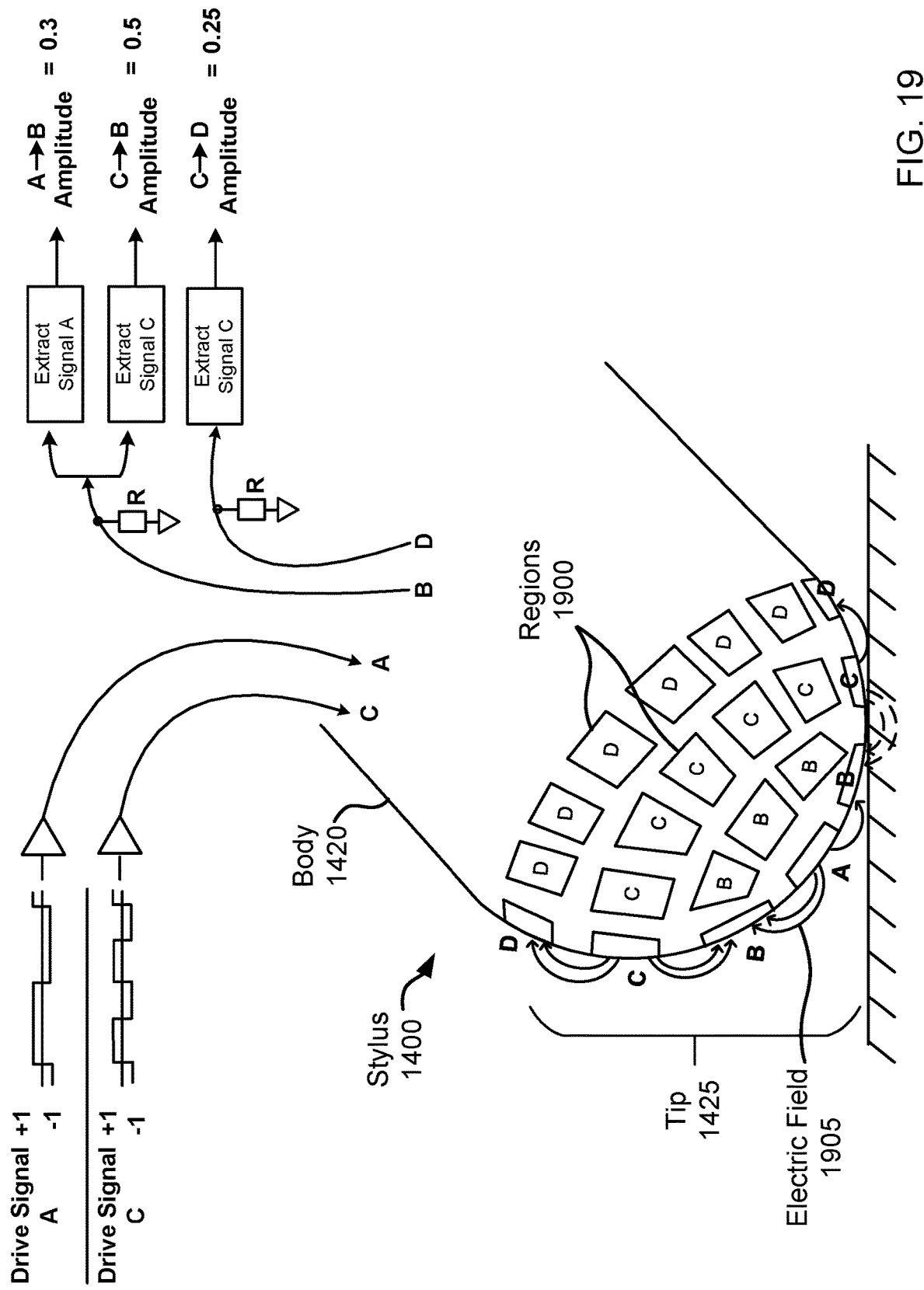
FIG. 19 is a view of a permittivity sensor in a stylus, according to an embodiment.

To detects touch events between the stylus 1400 and a surface, the contact sensor 1405 may include a permittivity sensor. FIG. 19 is a view of a permittivity sensor in a stylus 1400, according to an embodiment. The permittivity sensor includes conductive regions 1900 at or near the surface of the tip 1425 of the stylus 1400. The regions may be co-planar, adjacent to each other, and separated by a small distance (e.g., less than 1 millimeter). The conductive regions 1900 are not directly electrically connected to one another, and thus form a group of capacitors. The permittivity sensor may have as few as two sensing regions 1900, (or two groups of sensing regions) each forming one of the two terminals of a capacitor. The tip 1425 is configured such that the static electric field 1905 between the regions may pass through the air around the tip 1425. The contact detection controller 1410 (not illustrated in FIG. 19) is connected to the regions 1900 and may determine the permittivity of materials in the vicinity of the tip 1425 by measuring the capacitive coupling between the regions 1900.

When surrounded by air, the capacitive coupling between these regions 1900 is small. However, when the tip 1425 is brought close to a material with a dielectric permittivity that is substantially larger or smaller than that of air, the capacitive coupling between the regions changes. Changes in the capacitive coupling may be detectable when the distance between a region 1900 and the material is equal to or less than the separation distance between the region and another region. In an example situation, when the tip 1425 is close to, or in contact with, a surface with a permittivity that is higher than air, the capacitance between the regions 1900 increases. Alternatively, depending on the material and construction of the nearby surface, the capacitance may decrease. For example, the materials of the surface may deflect or counteract the electric field 1905 between the regions 1900. In either case, contact with the surface is indicated by a change in the capacitance relative to the tip 1425 being surrounded by air. In the example of FIG. 19, the change in capacitance is largest between regions B and C because those regions 1900 are closest to the surface. Since the materials and construction of the touch surface 131 are generally known, the sensing circuit may be configured to recognize the specific change in capacitance due to contact with the touch surface 131. For example, the touch surface 131 includes glass, a polymer, or other similar material with a dielectric permittivity which is substantially greater than air (e.g., by a factor of 5).

Similar to the capacitive displacement sensor, contact detection may be performed by applying one or more drive signals to a set of regions and measuring sensor signals in another set of regions. For example, a square wave driving signal is applied to the A regions and a second square wave driving signal is applied to the C regions. Simultaneously, response signals in the B and D regions may be measured. If the first and second waves are orthogonal to each other (e.g., the driving signals are Walsh functions), then the influence of each driving signal on regions B and D may be determined. Thus, the capacitive coupling between regions A and B; B and C; and C and D may be tracked. Example drive signals and sensing signal amplitudes are illustrated above the stylus in FIG. 19.

By determining the capacitive coupling for groups of regions (e.g., regions A, B, C, and D), supplementary information about the stylus 1400 in contact with the surface can be determined, and used to establish attributes of the touch behavior. For example, the tilt of the stylus 1400 relative to the surface is estimated. In particular, the area of the tip 1425 with the largest change in permittivity is indicative of the area of the tip in contact with the surface. In the example of FIG. 19, the contact detection controller 1410 (not shown) may determine that the stylus is tilted at 35 degrees based on the sensor signals.

D. Sleep Mode

In some embodiments, if no touch events are determined for a predetermined period of time, the stylus 1400 enters a "sleep mode" in which the stylus 1400 consumes less power. In the sleep mode, the contact sensor 1405 may take fewer or no measurements. In another example, the contact detection controller 1410 performs fewer or no touch event determinations while in sleep mode. Thus, if the stylus has a limited energy source, such as a battery, the sleep mode may increase the operating time of the stylus 1400.

Exiting sleep mode may be accomplished by various means and may be based on the type of contact sensor 1405 in the stylus 1400. In some cases, the stylus exits the sleep mode if the contact detection controller 1410 determines that the stylus 1400 is in contact with a surface. In some cases, the stylus 1400 exists the sleep mode if measurements from the contact sensor 1405 include values or average values that are greater than a predetermined threshold value. For example, for styli that can measure transient waves, transient waves that produce a signal with an amplitude above a threshold value trigger the stylus to exit the sleep mode. In another example, for styli with permittivity sensors or capacitive displacement sensors, a stylus may exit the sleep mode if an object, such as a hand, is determined to be nearby. For example, picking up a stylus, approaching the stylus, or waving a hand near the stylus triggers the stylus to exit the sleep mode. In some embodiments, the stylus 1400 includes an additional sensor, such as a motion sensor or proximity sensor, to determine whether the stylus 1400 is being used.

Sleep mode may be useful, not just for reducing energy consumption, but also so that a user can determine the status of a stylus 1400. For example, a stylus 1400 offers a selectable writing color using a button and a multi-color indication. For example, the stylus 1400 includes an RGB LED that blinks the selected color when is not in sleep mode. However, when in sleep mode, the indicator may not blink the selected color to conserve battery energy. A user may have several such styli 1400 in front of them, all in sleep mode, and may wish to know which colors are selected for each one. If the styli 1400 can be woken up by simply waving a hand over them, the user may easily determine the selected color for each. As each styli 1400 senses the hand nearby, it wakes up and resumes blinking the selected color.

V. Applications

The touch-sensitive devices and methods described above can be used in various applications. Touch-sensitive displays are one class of application. This includes displays for tablets, laptops, desktops, gaming consoles, smart phones and other types of compute devices. It also includes displays for TVs, digital signage, public information, whiteboards, e-readers and other types of good resolution displays. However, they can also be used on smaller or lower resolution displays: simpler cell phones, user controls (photocopier controls, printer controls, control of appliances, etc.). These touch-sensitive devices can also be used in applications other than displays. The "surface" over which the touches are detected could be a passive element, such as a printed image or simply some hard surface. This application could be used as a user interface, similar to a trackball or mouse.

VI. Additional Considerations

Upon reading this disclosure, those of skill in the art will appreciate still additional alternative structural and functional designs through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation, and details of the method and apparatus disclosed herein. Additionally, as used herein "coupled to" may include intervening components. For example, when two elements are described as being coupled to each other, this does not imply that the elements are directly coupled to each other nor does it preclude the use of other elements between the two.

What is claimed is:

1. A stylus comprising:
   a body and a tip, wherein the tip is moveable relative to the body, and a range of movement of the tip relative to the body is between 100 nanometers and 250 micrometers;

a contact sensor configured to measure one or more properties that indicate movement of the tip relative to the body;

a contact detection controller configured to determine, based on measurements of the one or more properties from the contact sensor, whether the stylus is in contact with a surface; and a reporting unit communicatively coupled to the contact detection controller and configured to transmit to a touch device an indication of whether the stylus is in contact with the surface.

2. The stylus of claim 1, wherein the contact detection controller is further configured to determine whether the surface with which the stylus is in contact is a touch surface of the touch device or another surface.

3. The stylus of claim 1, wherein the contact sensor includes conductive regions coupled to a tip of the stylus, and wherein the one or more properties measured by the contact sensor include an electrical signal from one or more of the conductive regions.

4. The stylus of claim 1, wherein the contact sensor includes a transducer, and the one or more properties measured by the contact sensor include an electrical signal from the transducer.

5. The stylus of claim 1, wherein the surface is a touch surface of the touch device and the contact sensor includes a frequency filter configured to filter out electrical signals resulting from the stylus contacting another surface.

6. The stylus of claim 1, wherein the contact sensor is a capacitive displacement sensor comprising:

a first conductive plate and a second conductive plate coupled to the body; and a third conductive plate coupled to the tip, wherein an electrical signal is applied to the first conductive plate, wherein the one or more properties measured by the contact sensor include an electrical signal from the second conductive plate.

7. The stylus of claim 1, wherein the contact sensor is an inductive displacement sensor comprising:

a first conductive coil coupled to the body;

a second conductive coil coupled to the body;

an inductive element coupled to the tip; and a power source configured to apply an electrical signal to the first conductive coil, wherein the one or more properties measured by the contact sensor include an electrical signal in the second conductive coil.

8. The stylus of claim 1, wherein the contact sensor includes an emitter, a detector, and a waveguide coupled to the body, the waveguide coupling optical beams from the emitter to the detector, and wherein the one or more properties measured by the contact sensor includes an electrical signal from the detector, the electrical signal indicating an amount of light propagating in the waveguide to the detector, wherein the amount of light propagating in the waveguide changes based on optical coupling between the waveguide and the tip.

9. The stylus of claim 1, wherein the contact sensor includes:

an emitter and detector coupled to the body; and a grid, a grating, or a mesh coupled to the tip and placed between the emitter and detector, wherein the one or more properties measured by the contact sensor include an electrical signal from the detector, the electrical signal indicating an amount of light propagating through the grid, grating, or mesh to the detector, wherein the amount of light propagating through is based on a position of the tip relative to the body.

10. The stylus of claim 1, wherein the contact sensor includes a transducer coupled to the body and the tip, wherein an electrical signal is applied to the transducer such that the tip vibrates, wherein the one or more properties measured by the contact sensor include an amplitude or frequency of an electrical signal from the transducer.

11. A system comprising:

a stylus comprising:

a body and a tip, wherein the tip is moveable relative to the body, and a range of movement of the tip relative to the body is between 100 nanometers and 250 micrometers;

a contact detection sensor configured to measure one or more properties that indicate movement of the tip relative to the body; and a reporting unit communicatively coupled to a contact detection controller and configured to transmit an indication of whether the stylus is in contact with a surface, the indication based on measurements from the contact sensor; and a touch device comprising the contact detection controller, the contact detection controller configured to receive the indication from the contact sensor via the reporting unit and configured to determine whether the stylus is in contact with a surface based on the indication.

12. The system of claim 11, wherein the indication comprises one or more measurements from the contact detection sensor.

13. The system of claim 11, wherein the stylus further comprises a contact detection controller configured to determine, based on measurements of the one or more properties from the contact sensor, whether the stylus is in contact with a surface.

14. The system of claim 11, wherein the contact detection controller is further configured to determine whether the surface with which the stylus is in contact is a touch surface of the touch device or another surface.

15. The system of claim 11, wherein the contact sensor includes conductive regions coupled to a tip of the stylus, and wherein the one or more properties measured by the contact sensor include an electrical signal from one or more of the conductive regions.

16. The system of claim 11, wherein the contact sensor includes a transducer, and wherein the one or more properties measured by the contact sensor include an electrical signal from the transducer.

* * * * *